(12) United States Patent
Deng et al.

(10) Patent No.: US 10,778,287 B2
(45) Date of Patent: Sep. 15, 2020

(54) MULTIPOINT DATA TRANSMISSION METHOD AND APPARATUS

(71) Applicant: Huawei Technologies Co., Ltd., Shenzhen (CN)

(72) Inventors: Na Deng, Shenzhen (CN); Haibao Ren, Shanghai (CN); Yuanjie Li, Shanghai (CN); Ting Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 67 days.

(21) Appl. No.: 16/149,518

(22) Filed: Oct. 2, 2018

(65) Prior Publication Data

US 2019/0036570 A1 Jan. 31, 2019

Related U.S. Application Data

(63) Continuation of application No. PCT/CN2017/079656, filed on Apr. 7, 2017.

(30) Foreign Application Priority Data

Apr. 8, 2016 (CN) .......................... 2016 1 0218260
Jun. 27, 2016 (CN) .......................... 2016 1 0480628

(51) Int. Cl.
*H04B 7/024* (2017.01)
*H04B 7/0413* (2017.01)
(Continued)

(52) U.S. Cl.
CPC ........... *H04B 7/024* (2013.01); *H04B 7/0413* (2013.01); *H04W 72/0426* (2013.01);
(Continued)

(58) Field of Classification Search
CPC ... H04W 16/28; H04W 28/16; H04W 72/042; H04W 72/0426; H04W 72/024; H04B 7/0413
See application file for complete search history.

(56) References Cited

U.S. PATENT DOCUMENTS 9,923,684 B2 3/2018 Ng et al.
2013/0155968 A1* 6/2013 Pelletier .............. H04W 72/042
370/329

(Continued)

FOREIGN PATENT DOCUMENTS

CN 101686080 A 3/2010
CN 102164372 A 8/2011
(Continued)

OTHER PUBLICATIONS

3rd Generation Partnership Project;Technical specification Group Radio Access Network; Evolved Universal Terrestrial Radio Access (E-UTRA); Physical layer procedures (Release 13), 3GPP TS 36.213 V13.1.1 (Mar. 2016), 361 pages.
(Continued)

*Primary Examiner* — Mewale A Ambaye
(74) *Attorney, Agent, or Firm* — Slater Matsil, LLP

(57) ABSTRACT

A data transmission method and apparatus are provided. The method includes: receiving control information from a network side device, wherein the control information comprises transmission parameter indication information, wherein the transmission parameter indication information is used to indicate a quantity of transport layers for at least two codewords and port numbers of ports for the at least two codewords; and determining, based on the transmission parameter indication information, a quantity of transport layers for at least two codewords and port numbers of ports for the at least two codewords, wherein ports used by different codewords of the at least two codewords are
(Continued)

non-quasi-co-location, and ports used by one codeword of the at least two codewords are quasi-co-location when the codeword has more than one port.

20 Claims, 4 Drawing Sheets

(51) Int. Cl.
*H04W 72/04* (2009.01)
*H04W 28/16* (2009.01)
*H04W 16/28* (2009.01)

(52) U.S. Cl.
CPC ............ *H04W 16/28* (2013.01); *H04W 28/16* (2013.01); *H04W 72/042* (2013.01); *H04W 72/044* (2013.01)

(56) References Cited

U.S. PATENT DOCUMENTS

| | | | |
|---|---|---|---|
| 2013/0301434 | A1 | 11/2013 | Krishnamurthy et al. |
| 2014/0133395 | A1 | 5/2014 | Nam et al. |
| 2014/0185495 | A1 | 7/2014 | Kuchibhotla et al. |
| 2014/0192732 | A1 | 7/2014 | Chen et al. |
| 2014/0192734 | A1 | 7/2014 | Ng et al. |
| 2014/0198763 | A1 | 7/2014 | Sorrentino et al. |
| 2014/0241454 | A1* | 8/2014 | Kim .................. H04B 7/024 375/267 |
| 2015/0189626 | A1* | 7/2015 | Zhu .................... H04W 72/042 370/329 |
| 2015/0215093 | A1 | 7/2015 | Kim et al. |
| 2015/0280877 | A1 | 10/2015 | Chen et al. |
| 2015/0304997 | A1* | 10/2015 | Park ........................ H04L 23/00 370/330 |
| 2015/0341099 | A1* | 11/2015 | Kang .................. H04B 7/0456 375/267 |
| 2015/0341877 | A1 | 11/2015 | Yi et al. |
| 2015/0365152 | A1 | 12/2015 | Frenne et al. |
| 2015/0382376 | A1 | 12/2015 | Tanaka |
| 2016/0119947 | A1 | 4/2016 | Park et al. |
| 2016/0157108 | A1 | 6/2016 | Park et al. |
| 2017/0223686 | A1 | 8/2017 | You et al. |
| 2018/0083681 | A1* | 3/2018 | Faxer ................... H04B 7/0626 |

FOREIGN PATENT DOCUMENTS

| | | |
|---|---|---|
| CN | 102170335 A | 8/2011 |
| CN | 103298117 A | 9/2013 |
| CN | 103298118 A | 9/2013 |
| CN | 103298119 A | 9/2013 |
| CN | 104272833 A | 1/2015 |
| CN | 104919724 A | 9/2015 |
| CN | 105122916 A | 12/2015 |
| EP | 2654333 A1 | 10/2013 |
| EP | 2775642 A2 | 9/2014 |
| EP | 2800286 A1 | 11/2014 |
| EP | 2883324 A1 | 6/2015 |
| EP | 2905910 A1 | 8/2015 |
| EP | 2524559 B1 | 11/2016 |
| JP | 2016506690 A | 3/2016 |
| WO | 2009076995 A1 | 6/2009 |
| WO | 2011075908 A1 | 6/2011 |
| WO | 2014129716 A1 | 8/2014 |
| WO | 2015037885 A1 | 3/2015 |
| WO | 2015099330 A1 | 7/2015 |
| WO | 2016018079 A1 | 2/2016 |
| WO | 2017171481 A1 | 10/2017 |

OTHER PUBLICATIONS

3rd Generation Partnership Project; Technical Specification Group Radio Access Network; Evolved Universal Terrestrial Radio Access (E-UTRA); Multiplexing and channel coding (Release 13), 3GPP TS 36.212 V13.1.0 (Mar. 2016), 129 pages.

3rd Generation Partnership Project; Technical Specification Group Radio Access Network;Evolved Universal Terrestrial Radio Access (E-UTRA); Physical channels and modulation (Release 13), 3GPP TS 36.211 V13.1.0 (Mar. 2016), 155 pages.

3rd Generation Partnership Project; Technical Specification Group Radio Access Network; Evolved Universal Terrestrial Radio Access Network (E-UTRAN); X2 application protocol (X2AP) (Release 13), 3GPP TS 36.423 V13.3.0 (Mar. 2016), 230 pages.

3rd Generation Partnership Project; Technical Specification Group Radio Access Network; Evolved Universal Terrestrial Radio Access (E-UTRA); Radio Resource Control (RRC); Protocol specification (Release 13), 3GPP TS 36.331 V13.1.0 (Mar. 2016), 551 pages.

ETSI: "LTE; Evolved Universal Terrestrial Radio Access (E-UTRA)," Physical layer procedures, 3GPP TS 36.213, Feb. 2015, 227 pages, version 12.4.0 Release 12.

Renesas Mobile Europe Ltd.: "Downlink control signaling for CoMP," 3GPP TSG-RAN WG1 Meeting #68bis, R1-121395, Mar. 26-30, 2012, 4 pages, Jeju, Korea.

Samsung: "Remaining issues on quasi co-location between CSI-RS, CRS and DMRS," 3GPP TSG-RAN WG1#70bis meeting, R1-124558, Oct. 8-12, 2012, 5 pages, San Diego, USA.

NTT Docomo, "Downlink Control Signaling for Rel. 11 CoMP," 3GPP TSG RAN WG1 Meeting #71, R1-124839, New Orleans, USA, Nov. 12-16, 2012, 4 pages.

Huawei et al., "CoMP schemes for non-ideal backhaul and Inter-eNodeB signaling," 3GPP TSG RAN WG1 #74bis, R1-134356, Guangzhou, China, Oct. 7-11, 2013, 5 pages.

* cited by examiner

MULTIPOINT DATA TRANSMISSION METHOD AND APPARATUS

CROSS-REFERENCE TO RELATED APPLICATIONS

This application is a continuation of International Application No. PCT/CN2017/079656, filed on Apr. 7, 2017, which claims priority to Chinese Patent Application No. 201610218260.5, filed on Apr. 8, 2016 and Chinese Patent Application No. 201610480628.5, filed on Jun. 27, 2016. The disclosures of the aforementioned applications are hereby incorporated by reference in their entireties.

TECHNICAL FIELD

This application relates to wireless communications technologies, and in particular, to a multipoint data transmission method and apparatus.

BACKGROUND

A Multiple Input Multiple Output (MIMO) technology is also referred to as multiple-antenna transmission. In this technology, system reliability may be improved through space diversity, a system capacity may be improved through spatial multiplexing, and cell coverage may be improved through beamforming. Therefore, the technology is considered as one of key technologies capable of implementing data transmission with a high rate and high quality in future mobile communication, and has wide application prospect in a fourth generation (4G) mobile communications system or even in a fifth generation (5G) mobile communications system. Specifically, in the Long Term Evolution (LTE) Release 10, a new transmission mode (transmission mode 9) is introduced, so as to support demodulation reference signals (DMRS) of eight ports and support MIMO transmission. Specifically, to support 8-antenna transmission, a base station needs to indicate, in control information carried by a physical downlink control channel (PDCCH), an antenna port number corresponding to the DMRS and a quantity of transport layers corresponding to a physical downlink shared channel (PDSCH) of a terminal. Specifically, the base station can perform indication in downlink control information in a downlink control information (DCI) format 2C/2D. As one of key technologies for MIMO, a precoding technology is applied to a transmit end, so as to minimize a correlation between signals on different transmit antennas when the signals reach a user, minimize interference between the signals on the different transmit antennas when the signals reach a receive antenna, and maximize an array gain between a plurality of antennas.

In a current system, to resolve a problem of interference between cells and improve an edge user throughput, a coordinated multipoint transmission/reception (CoMP) technology is proposed. In addition, to support the CoMP technology, antenna port quasi co-location (QCL) is introduced, and signals sent from QCL antenna ports experience same large-scale fading. Further, a physical downlink shared channel resource element mapping and quasi-co-location indicator (PDSCH RE Mapping and Quasi-Co-Location Indicator, PQI) is introduced, so as to indicate, to the terminal, a base station that sends PDSCH information and a group of antenna ports that are consistent with a corresponding channel large-scale fading feature, and the terminal can learn of, by using the PQI in combination with a PDSCH mapping information element configured based on radio resource control (RRC), a radio channel parameter corresponding to a group of DMRSs required to demodulate the PDSCH.

However, based on conventional centralized MIMO, in the current system, only one group of QCL parameters are configured in downlink control information in the DCI format 2D. To be specific, the terminal can receive the PDSCH information from only one base station. After distributed MIMO is introduced, in other words, a plurality of transmit antennas are distributed in different geographical locations, the terminal may simultaneously receive a plurality of pieces of PDSCH information from a plurality of non-QCL base stations. If the current system is still used, the PDSCH information sent by the non-QCL base stations cannot be separately indicated, and consequently, the terminal cannot learn of a non-QCL base station that transmits data.

SUMMARY

This application provides a multiple-site data transmission method and apparatus, to resolve a prior-art problem that a plurality of non-QCL base stations that transmit data to a terminal cannot be indicated to the terminal.

A first aspect of this application provides a multiple-site data transmission method. The method includes generating, by a network side device, control information that includes at least two site indication messages, where the at least two site indication messages respectively indicate at least two sites for transmitting data to a terminal, the at least two sites are non-quasi-co-location sites, and the at least two sites are in a one-to-one correspondence with the at least two site indication messages. The method also includes sending, by the network side device, the control information to the terminal.

Optionally, the site indication message may be an index number configured for a group of quasi-co-location parameters, and the terminal may determine configuration parameters of these non-quasi-co-location sites based on the index number.

The site indication message may be a PQI, and the control information may be DCI. This is not limited herein.

In this embodiment, the network side device generates the control information that includes the at least two site indication messages, and sends the control information to the terminal, so that after receiving the control information, the terminal can learn of, based on the at least two site indication messages in the control information, the at least two non-quasi-co-location sites for transmitting the data to the terminal. Therefore, in a distributed MIMO scenario, the terminal can obtain site indication messages corresponding to a plurality of non-quasi-co-location sites, and the plurality of non-quasi-co-location sites for transmitting data can be indicated to the terminal, so that the terminal can receive the data transmitted by these non-quasi-co-location sites.

Optionally, before the sending, by the network side device, the control information to the terminal, the method further includes: sending, by the network side device, configuration information to the terminal, where the configuration information is used to indicate a quantity of at least two sites.

Optionally, the control information further includes transmission parameter indication information, and the transmission parameter indication information is used to indicate a quantity of transport layers and port numbers of ports that are used by the at least two sites.

Alternatively, the control information further includes at least two pieces of transmission parameter indication information. The at least two pieces of transmission parameter indication information are in a one-to-one correspondence with the at least two sites, and the transmission parameter indication information is used to indicate a quantity of transport layers used by a corresponding site.

Further, the control information further includes port number set indication information, and the port number set indication information is used to indicate a set of available port numbers assigned to the at least two sites.

The set of port numbers may include a port number assigned in a preset order of the port numbers to the set of port numbers, a port number assigned in a frequency division manner to the set of port numbers, or a port numbers assigned in a code division manner to the set of port numbers, or the like.

Optionally, the at least two sites transmit data to the terminal on a same time-frequency resource block. Further, the at least two sites use ports with different port numbers.

Correspondingly, the control information may further include a resource block assignment field indication. The resource block assignment field indication is used to indicate the time-frequency resource block on which the at least two sites transmit the data.

In another implementation, the control information further includes indication information of a mapping manner of a codeword and a site, and the indication information of a mapping manner of a codeword and a site is used to indicate a mapping manner of at least two codewords and the at least two sites.

The mapping manner of the at least two codewords and the at least two site indication messages includes any one or combination of the following: each codeword is corresponding to one site, each codeword is corresponding to a plurality of sites, or a plurality of codewords are corresponding to one site. When a quantity of codewords is the same as the quantity of at least two sites, each codeword may be corresponding to one site; when a quantity of codewords is less than the quantity of at least two sites, each codeword may be corresponding to a plurality of sites; or when a quantity of codewords is greater than the quantity of at least two sites, a plurality of codewords may be corresponding to one site. This is not limited herein.

Optionally, the control information includes at least two pieces of codeword indication information, each piece of codeword indication information is corresponding to one codeword, and the codeword indication information includes codeword transmission indication information and/or codeword resource block indication information.

The codeword transmission indication information is used to indicate one or more of the following transmission-related information: a quantity of transport layers used to transmit a corresponding codeword, a port number of a port used to transmit the corresponding codeword, a scrambling identity, data resource element mapping information, quasi-co-location indication information, and transmission point indication information.

The codeword resource block indication information is used to indicate a time-frequency resource block for transmitting the corresponding codeword.

The scrambling identity is used to indicate scrambling information of the data.

The data resource element mapping information is used to indicate information about a resource element to which data is mapped.

The quasi-co-location indication information is used to indicate a large-scale feature of an antenna port of a transmission point that transmits a corresponding codeword.

The transmission point indication information is used to indicate the site that transmits the corresponding codeword.

Optionally, the sending, by the network side device, the control information to the terminal includes: determining, by the network side device, a control channel format based on a format of the control information and/or a transmission mode; and sending, by the network side device, the control information to the terminal based on the control channel format.

A second aspect of this application provides a multiple-site data transmission method. The method includes: generating, by a network side device, control information that includes transmission parameter indication information, where the transmission parameter indication information is used to indicate a quantity of transport layers and port numbers of ports that are used by at least two sites; or generating, by a network side device, control information that includes at least two pieces of transmission parameter indication information, where the at least two pieces of transmission parameter indication information are in a one-to-one correspondence with at least two sites, and the transmission parameter indication information is used to indicate a quantity of transport layers used by a corresponding site. Optionally, the control information further includes port number set indication information, and the port number set indication information is used to indicate a set of available port numbers assigned to the at least two sites.

The at least two sites are non-quasi-co-location sites.

The network side device sends the control information to the terminal.

In this embodiment, a quantity of transport layers and port numbers of a plurality of non-quasi-co-location sites may be indicated to the terminal.

For another implementation in this embodiment, refer to the foregoing multiple-site data transmission method according to the first aspect. Details are not described herein again.

A third aspect of this application provides a multiple-site data transmission method. The method includes receiving, by a terminal, control information sent by a network side device, where the control information includes at least two site indication messages. The method also includes determining, by the terminal based on the at least two site indication messages, at least two sites for transmitting data, where the at least two sites are non-quasi-co-location sites, and the at least two sites are in a one-to-one correspondence with the at least two site indication messages.

Optionally, the site indication message may be an index number configured for a group of quasi-co-location parameters, and the terminal may determine configuration parameters of these non-quasi-co-location sites based on the index number.

Optionally, before the receiving, by a terminal, control information sent by a network side device, the method further includes: obtaining, by the terminal, a quantity of bits of the control information based on a preset quantity of at least two sites.

Optionally, before the receiving, by a terminal, control information sent by a network side device, the method further includes: receiving, by the terminal, configuration information sent by the network side device, where the configuration information is used to indicate a quantity of at least two sites; and obtaining, by the terminal, a quantity of bits of the control information based on the quantity of at least two sites.

Optionally, the receiving, by a terminal, control information sent by a network side device includes: receiving, by the terminal based on the quantity of bits of the control information, the control information sent by the network side device.

Optionally, the control information further includes transmission parameter indication information, and the transmission parameter indication information is used to indicate a quantity of transport layers and port numbers of ports that are used by the at least two sites.

The method further includes: determining, by the terminal based on the transmission parameter indication information and a preset mapping relationship between the transmission parameter indication information and both of the quantity of transport layers and the port numbers of the at least two sites, the quantity of transport layers and the port numbers of the ports that are used by the at least two sites.

Optionally, the control information further includes at least two pieces of transmission parameter indication information, and the at least two pieces of transmission parameter indication information are in a one-to-one correspondence with the at least two sites.

Optionally, the method further includes: determining, by the terminal based on the at least two pieces of transmission parameter indication information and a preset mapping relationship between the transmission parameter indication information and a quantity of transport layers, a quantity of transport layers used by the at least two sites.

Further, the control information further includes port number set indication information.

Optionally, the method further includes: obtaining, by the terminal based on the port number set indication information and a preset mapping relationship between the port number set indication information and a set of port numbers, a set of available port numbers assigned to each of the at least two sites; and determining, by the terminal based on the set of available port numbers assigned to each of the at least two sites and the quantity of transport layers used by the at least two sites, port numbers of ports used by the at least two sites.

The set of port numbers includes a port number assigned in a preset order of the port numbers to the set of port numbers, a port number assigned in a frequency division manner to the set of port numbers, or a port numbers assigned in a code division manner to the set of port numbers.

Optionally, after the determining, by the terminal based on the at least two site indication messages, at least two sites for transmitting data, the method further includes: receiving, by the terminal, data transmitted by the at least two sites to the terminal on a same time-frequency resource block.

Correspondingly, the control information may further include a resource block assignment field indication. The resource block assignment field indication is used to indicate the time-frequency resource block on which the at least two sites transmit the data. The terminal may obtain, based on the resource block assignment field indication in the control information, the time-frequency resource block on which the at least two sites transmit the data.

In this case, each site uses a port with a different port number.

Optionally, before the receiving, by a terminal, control information sent by a network side device, the method further includes: obtaining, by the terminal, a data transmission manner of the at least two sites and the terminal.

Optionally, the receiving, by a terminal, control information sent by a network side device includes: receiving, by the terminal, the control information based on the data transmission manner.

The control information further includes indication information of a mapping manner of a codeword and a site, and the indication information of a mapping manner of a codeword and a site is used to indicate a mapping manner of at least two codewords and the at least two sites.

Optionally, the method further includes: obtaining, by the terminal, a mapping relationship between the at least two codewords and the at least two sites based on the mapping manner of the at least two codewords and the at least two site indication messages.

Optionally, the terminal obtains, based on the mapping relationship between the at least two codewords and the at least two sites and a quantity of transport layers used by the at least two sites, a quantity of transport layers that are respectively corresponding to the at least two codewords.

A mapping manner of the at least two codewords and the at least two site indication messages includes any one or combination of the following: each codeword is corresponding to one site, each codeword is corresponding to a plurality of sites, or a plurality of codewords are corresponding to one site.

Further, when a total quantity of transport layers of the at least two sites is 2 or 4 and a data transmission manner is a transmit diversity-related transmission manner, the method further includes: obtaining, by the terminal based on a preset mapping relationship between a single codeword and a quantity of transport layers, a mapping relationship between the single codeword and each of a quantity of transport layers used by the at least two sites.

Optionally, the control information includes at least two pieces of codeword indication information, each piece of codeword indication information is corresponding to one codeword, and the codeword indication information includes codeword transmission indication information and/or codeword resource block indication information.

The codeword transmission indication information is used to indicate one or more of the following transmission-related information: a quantity of transport layers used to transmit a corresponding codeword, a port number of a port used to transmit the corresponding codeword, a scrambling identity, data resource element mapping information, quasi-co-location indication information, and transmission point indication information.

The codeword resource block indication information is used to indicate a time-frequency resource block for transmitting the corresponding codeword.

Optionally, the codeword indication information includes the codeword transmission indication information, and the method further includes: determining, by the terminal, transmission-related information of at least two codewords based on codeword transmission indication information of each codeword and a preset mapping relationship between the codeword transmission indication information and the transmission-related information.

Optionally, the codeword indication information includes the codeword resource block indication information, and the method further includes: determining, by the terminal based on the codeword resource block indication information and a preset mapping relationship between the codeword resource block indication information and a time-frequency resource block, the time-frequency resource block for transmitting the corresponding codeword.

Optionally, the receiving, by a terminal, control information sent by a network side device includes: determining, by the terminal, a control channel format based on a format of the control information and/or a transmission mode; and receiving, by the terminal based on the control channel format, the control information sent by the network side device.

A fourth aspect of this application provides a multiple-site data transmission method. The fourth aspect is corresponding to the second aspect, and the method includes: receiving, by a terminal, control information sent by a network side device, where the control information includes transmission parameter indication information, and the transmission parameter indication information is used to indicate a quantity of transport layers and port numbers of ports that are used by at least two sites; or the control information includes at least two pieces of transmission parameter indication information and port number set indication information, the at least two pieces of transmission parameter indication information are in a one-to-one correspondence with the at least two sites, and the transmission parameter indication information is used to indicate a quantity of transport layers used by a corresponding site; the port number set indication information is used to indicate a set of available port numbers assigned to the at least two sites; and the at least two sites are non-quasi-co-location sites; and determining, by the terminal based on the control information, a quantity of transport layers and port numbers of ports that are used by the at least two sites.

For another implementation, refer to the third aspect. Details are not described herein again.

A fifth aspect of this application provides a multiple-site data transmission apparatus. The apparatus includes: a processor, configured to generate control information that includes at least two site indication messages, where the at least two site indication messages respectively indicate at least two sites for transmitting data to a terminal, the at least two sites are non-quasi-co-location sites, and the at least two sites are in a one-to-one correspondence with the at least two site indication messages. The apparatus also includes a transmitter, configured to send the control information to the terminal.

Optionally, before sending the control information to the terminal, the transmitter is further configured to send configuration information to the terminal, where the configuration information is used to indicate a quantity of at least two sites.

In an implementation, the control information further includes transmission parameter indication information, and the transmission parameter indication information is used to indicate a quantity of transport layers and port numbers of ports that are used by the at least two sites.

In another implementation, the control information further includes at least two pieces of transmission parameter indication information. The at least two pieces of transmission parameter indication information are in a one-to-one correspondence with the at least two sites, and the transmission parameter indication information is used to indicate a quantity of transport layers used by a corresponding site.

Optionally, the control information further includes port number set indication information, and the port number set indication information is used to indicate a set of available port numbers assigned to the at least two sites.

The set of port numbers includes a port number assigned in a preset order of the port numbers to the set of port numbers, a port number assigned in a frequency division manner to the set of port numbers, or a port numbers assigned in a code division manner to the set of port numbers. This application is not limited thereto.

Optionally, the at least two sites transmit data to the terminal on a same time-frequency resource block.

Optionally, the at least two sites use ports with different port numbers.

Optionally, the control information further includes indication information of a mapping manner of a codeword and a site, and the indication information of a mapping manner of a codeword and a site is used to indicate a mapping manner of at least two codewords and the at least two sites.

The mapping manner of the at least two codewords and the at least two sites includes any one or combination of the following: each codeword is corresponding to one site, each codeword is corresponding to a plurality of sites, or a plurality of codewords are corresponding to one site.

Optionally, the control information includes at least two pieces of codeword indication information, each piece of codeword indication information is corresponding to one codeword, and the codeword indication information includes codeword transmission indication information and/or codeword resource block indication information.

The codeword transmission indication information is used to indicate one or more of the following transmission-related information: a quantity of transport layers used to transmit a corresponding codeword, a port number of a port used to transmit the corresponding codeword, a scrambling identity, data resource element mapping information, quasi-co-location indication information, and transmission point indication information.

The codeword resource block indication information is used to indicate a time-frequency resource block for transmitting the corresponding codeword.

Optionally, the processor is further configured to determine a control channel format based on a format of the control information and/or a transmission mode; and the transmitter is specifically configured to send the control information to the terminal based on the control channel format.

A sixth aspect of this application provides a multiple-site data transmission apparatus. The apparatus includes a receiver, configured to receive control information sent by a network side device, where the control information includes at least two site indication messages. The apparatus also includes a processor, configured to determine, based on the at least two site indication messages, at least two sites for transmitting data, where the at least two sites are non-quasi-co-location sites, and the at least two sites are in a one-to-one correspondence with the at least two site indication messages.

Optionally, before the receiver receives the control information sent by the network side device, the processor is further configured to obtain a quantity of bits of the control information based on a preset quantity of at least two sites.

Optionally, before receiving the control information sent by the network side device, the receiver is further configured to receive configuration information sent by the network side device, where the configuration information is used to indicate the quantity of at least two sites. Correspondingly, the processor is configured to obtain the quantity of bits of the control information based on the quantity of at least two sites.

Further, when receiving the control information sent by the network side device, specifically, the receiver receives, based on the quantity of bits of the control information, the control information sent by the network side device.

In an implementation, the control information further includes transmission parameter indication information, and the transmission parameter indication information is used to indicate a quantity of transport layers and port numbers of ports that are used by the at least two sites.

Correspondingly, the processor is further configured to determine, based on the transmission parameter indication information and a preset mapping relationship between the transmission parameter indication information and both of the quantity of transport layers and the port numbers of the at least two sites, the quantity of transport layers and the port numbers of the ports that are used by the at least two sites.

In another implementation, the control information further includes at least two pieces of transmission parameter indication information, and the at least two pieces of transmission parameter indication information are in a one-to-one correspondence with the at least two sites.

Correspondingly, the processor is further configured to determine, based on the at least two pieces of transmission parameter indication information and a preset mapping relationship between the transmission parameter indication information and a quantity of transport layers, a quantity of transport layers used by the at least two sites.

Optionally, the control information further includes port number set indication information.

Correspondingly, the processor is further configured to: obtain, based on the port number set indication information and a preset mapping relationship between the port number set indication information and a set of port numbers, a set of available port numbers assigned to each of the at least two sites; and determine, based on the set of available port numbers assigned to each of the at least two sites and the quantity of transport layers used by the at least two sites, port numbers of ports used by the at least two sites.

The set of port numbers includes a port number assigned in a preset order of the port numbers to the set of port numbers, a port number assigned in a frequency division manner to the set of port numbers, or a port numbers assigned in a code division manner to the set of port numbers.

The receiver is further configured to receive data transmitted by the at least two sites to the terminal on a same time-frequency resource block.

Optionally, the processor is further configured to obtain a data transmission manner of the at least two sites and the terminal. Correspondingly, when receiving the control information sent by the network side device, specifically, the receiver receives the control information based on the data transmission manner.

Further, when a total quantity of transport layers of the at least two sites is 2 or 4 and the data transmission manner is a transmit diversity-related transmission manner, the processor is further configured to obtain, based on a preset mapping relationship between a single codeword and a quantity of transport layers, a mapping relationship between the single codeword and each of a quantity of transport layers used by the at least two sites.

Further, the control information further includes indication information of a mapping manner of a codeword and a site, and the indication information of a mapping manner of a codeword and a site is used to indicate a mapping manner of at least two codewords and the at least two sites.

Correspondingly, the processor is further configured to obtain a mapping relationship between the at least two codewords and the at least two sites based on the mapping manner of the at least two codewords and the at least two sites.

The processor is further configured to obtain, based on the mapping relationship between the at least two codewords and the at least two sites and the quantity of transport layers used by the at least two sites, a quantity of transport layers that are respectively corresponding to the at least two codewords.

Optionally, the control information includes at least two pieces of codeword indication information, each piece of codeword indication information is corresponding to one codeword, and the codeword indication information includes codeword transmission indication information and/or codeword resource block indication information.

The codeword transmission indication information is used to indicate one or more of the following transmission-related information: a quantity of transport layers used to transmit a corresponding codeword, a port number of a port used to transmit the corresponding codeword, a scrambling identity, data resource element mapping information, quasi-co-location indication information, and transmission point indication information.

The codeword resource block indication information is used to indicate a time-frequency resource block for transmitting the corresponding codeword.

Optionally, the codeword indication information includes the codeword transmission indication information.

The processor is further configured to determine transmission-related information of at least two codewords based on codeword transmission indication information of each codeword and a preset mapping relationship between the codeword transmission indication information and the transmission-related information.

Optionally, the codeword indication information includes the codeword resource block indication information.

The processor is further configured to determine, based on the codeword resource block indication information and a preset mapping relationship between the codeword resource block indication information and a time-frequency resource block, the time-frequency resource block for transmitting the corresponding codeword.

Optionally, the processor is further configured to determine a control channel format based on a format of the control information and/or a transmission mode; and the receiver is specifically configured to receive, based on the control channel format, the control information sent by the network side device.

According to a seventh aspect, this application provides a multiple-site data transmission apparatus, where the multiple-site data transmission apparatus includes a function module configured to implement the method according to the first aspect.

According to an eighth aspect, this application further provides a multiple-site data transmission apparatus, where the multiple-site data transmission apparatus includes a function module configured to implement the method according to the second aspect.

According to a ninth aspect, this application further provides a multiple-site data transmission apparatus, where the multiple-site data transmission apparatus includes a function module configured to implement the method according to the third aspect.

According to a tenth aspect, this application further provides a multiple-site data transmission apparatus, where the multiple-site data transmission apparatus includes a function module configured to implement the method according to the fourth aspect.

According to an eleventh aspect, this application further provides a computer storage medium, where the computer storage medium stores program code, and the program code includes an instruction used to implement any possible implementation of the method according to the first aspect, the second aspect, the third aspect, or the fourth aspect.

According to the multiple-site data transmission method and apparatus that are provided in this application, the network side device generates the control information that includes the at least two site indication messages, and sends the control information to the terminal, so that after receiving the control information, the terminal can learn of, based on the at least two site indication messages in the control information, the at least two non-quasi-co-location sites for transmitting the data to the terminal. Therefore, in a distributed MIMO scenario, the terminal can obtain site indication messages corresponding to a plurality of non-quasi-co-location sites, and the plurality of non-quasi-co-location sites for transmitting data can be indicated to the terminal, so that the terminal can receive the data transmitted by these non-quasi-co-location sites.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
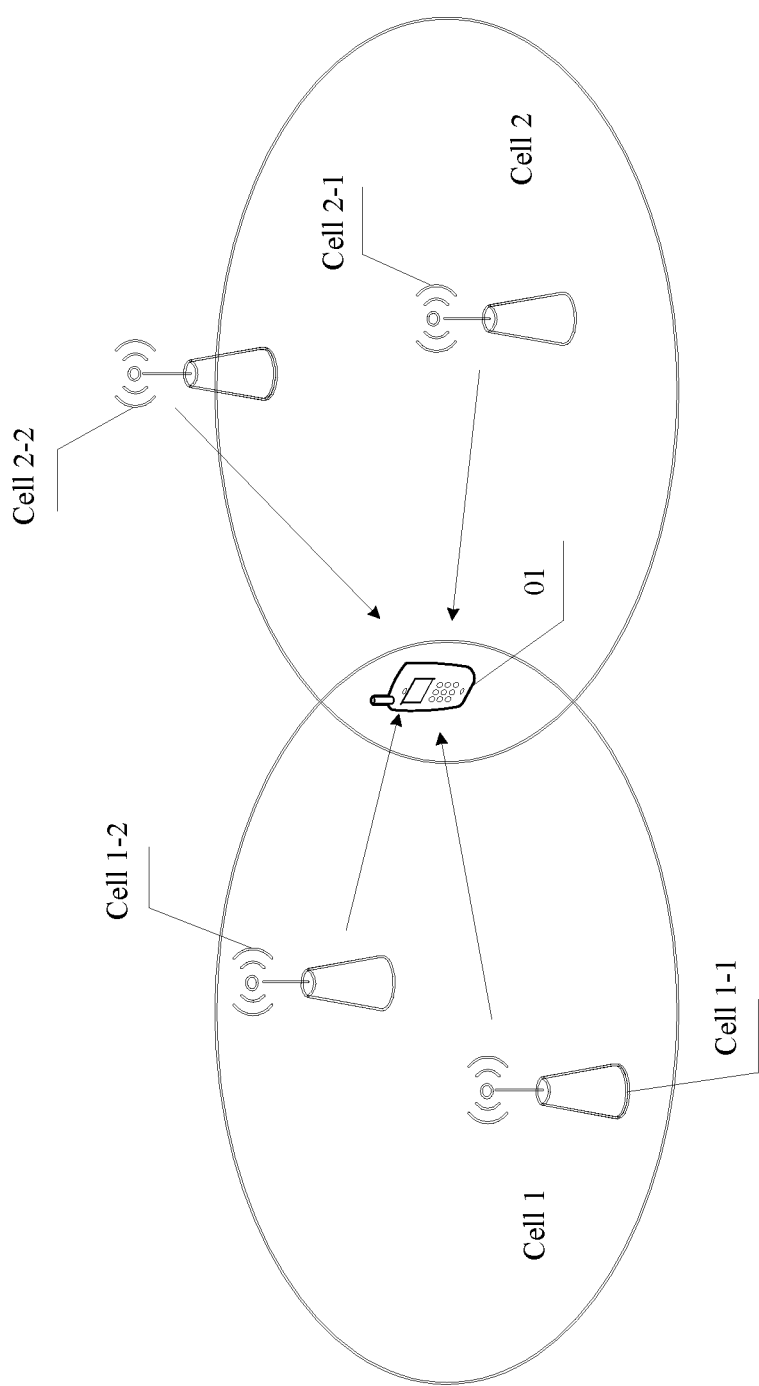
FIG. 1 to FIG. 3 are schematic diagrams of application scenarios of a multipoint data transmission method according to this application.

In this application, based on a CoMP technology, in combination with an MIMO technology, in a distributed MIMO scenario, a terminal may receive data transmitted by a plurality of non-QCL base stations. This application is applicable to both a homogeneous network and a heterogeneous network. This is not limited herein.

In the distributed MIMO scenario, that is, a plurality of sites are distributed in different geographical locations, a multipoint diversity coordinated transmission manner may be used, that is, antennas distributed in two or more sites (also referred to as a transmission point) transmit a signal in a space frequency block coding (SFBC) manner. Specifically, two sites are used as an example, each site may have two antennas, each of the two sites performs precoding to generate one data stream, and two antennas SFBC is further performed on two data streams of the two sites. Alternatively, each site has two antennas, and all four antennas of the two sites perform SFBC and frequency switched transmit diversity (FSTD) at four antenna ports. A multipoint multiflow coordinated transmission manner may be further used, that is, two or more sites independently perform precoding and send different data streams and different code blocks to a same terminal. Certainly, this application is not limited to the two transmission manners.

The site in this application may be a base transceiver station (BTS) in Global System for Mobile Communications (GSM) or Code Division Multiple Access (CDMA), or may be a NodeB (NB) in Wideband Code Division Multiple Access (WCDMA), or may be an evolved NodeB (eNB or eNodeB) in Long Term Evolution (LTE), a relay node or an access point, a base station in a future 5G network, or the like. This is not limited herein.

Further, the site in this application may be referred to as a "coordinated transmission point", which is a transmission point used for coordinated transmission. The coordinated transmission point is a transmission point in a coordinated set. For example, the coordinated transmission point may be a base station or a cell. Further, the coordinated transmission point may be a serving base station or a coordinated base station. The coordinated transmission point may alternatively be a remote radio unit (RRU) in a distributed base station. Signals sent by any two transmission points in a plurality of coordinated transmission points may experience different large-scale fading features (that is, non-quasi-co-location), and may belong to a same cell or different cells. This is not limited. The large-scale feature includes one or more of delay spread, Doppler spread, a Doppler shift, an average channel gain, and an average delay.

The terminal in this application may be a wireless terminal or a wired terminal. The wireless terminal may be a device that provides a user with connectivity of voice and/or other service data, a handheld device with a wireless connection function, or another processing device connected to a wireless modem. The wireless terminal may communicate with one or more core networks by using a radio access network (RAN). The wireless terminal may be a mobile terminal such as a mobile phone (or referred to as a "cellular" phone) or a computer with a mobile terminal. For example, the wireless terminal may be a portable, pocket-sized, handheld, computer built-in, or in-vehicle mobile apparatus that exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile site, a mobile station, a remote station, a remote terminal, an access terminal, a user terminal, a user agent, or user equipment (User Device or User Equipment). This is not limited herein.

Figure 2:
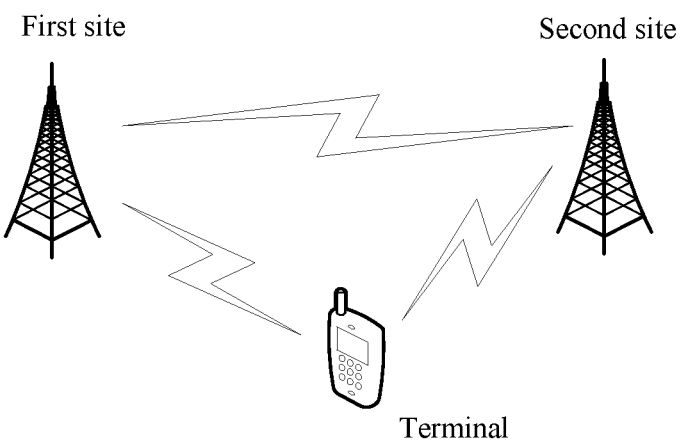
Figure 3:
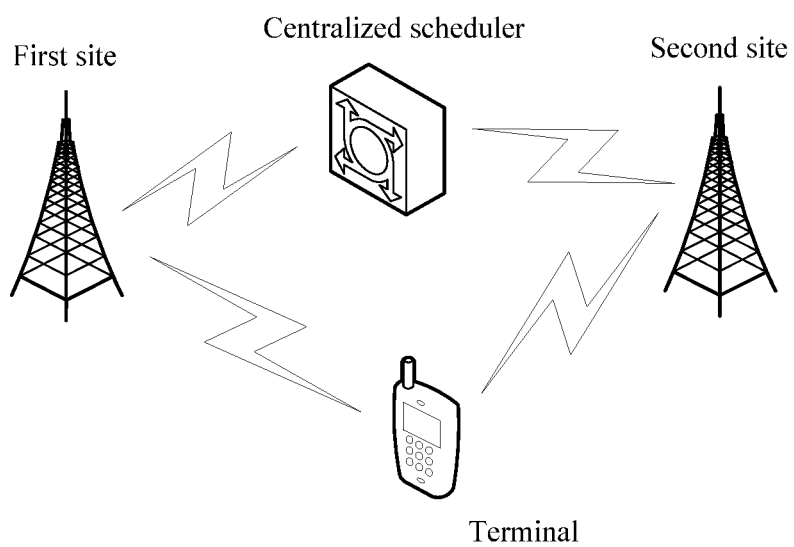

FIG. 1 to FIG. 3 are schematic diagrams of application scenarios of a multipoint data transmission method according to this application. As shown in FIG. 1, two cells are used as an example, that is, two sites distributed in different geographical locations form two cells: a cell 1 and a cell 2. Each site has two antennas, two antennas of the cell 1 are denoted as a cell 1-1 and a cell 1-2, and two antennas of the cell 2 are denoted as a cell 2-1 and a cell 2-2. These four antennas transmit signals to a terminal (UE) 01. A specific transmission manner is not specifically limited herein.

One of the two sites may be a serving site, and the other one is a coordinated site. Alternatively, both of the two sites may be serving sites. The serving site is a site to which a serving cell belongs, and the coordinated site is a site to which a coordinated cell belongs. This is not limited herein.

As shown in FIG. 2, a communications network system includes a first site, a second site, and a terminal.

The first site is a serving network side device (which may be a serving site) of the terminal, and the serving network side device is a network side device that provides the terminal with services such as an RRC connection, non-access stratum (NAS) mobility management, and security input by using a wireless air interface protocol. The first site may communicate with the terminal by using an air interface protocol. There may be one or more second sites. The second site and the first site are network side devices that meet different QCL. Generally, the second site and the first site are at different geographical locations. Generally, the second site is a neighboring network side device of the first site. The second site may also perform data transmission by using the air interface protocol. The second site is configured to assist the first site in jointly transmitting data to the terminal, for example, performing multiflow transmission or diversity transmission. Therefore, the second site may also be referred to as a coordinated network side device. The first site and the second site may also communicate with each other. For example, the first site and the second site deliver a control information and/or indication information to each other.

In actual application, the first site may also be the coordinated network side device, and the second site is the serving network side device.

In addition, the first site and the second site may be different transmission points of a same device, for example, two radio frequency units (RFU), or referred to as radio-frequency heads (RFH), that are relatively far from each other. Alternatively, the first site and the second site may be two independent network side devices, for example, two base stations.

In this application, that the first site and the second site simultaneously send data to the terminal has two meanings. A first meaning is that the first site and the second site send the data to the terminal on a same time domain resource. A second meaning is that the first site and the second site send the data to the terminal on different time domain resources.

It should be noted that, during CoMP transmission, it is assumed that wireless channels through which a plurality of antenna port signals received by the terminal pass have a same large-scale feature, that is, a plurality of antenna ports belong to a same QCL set. In this case, for two network side devices using different wireless channels to communicate with the terminal, if the two network side devices simultaneously send data to the terminal side device, joint virtualization needs to be performed on antennas in the two network side devices, so that the antennas form an antenna port that meets a QCL constraint. In addition, the network side devices send a demodulated reference signal and data on the antenna port. A joint virtualization method is an SFN technology. To be specific, a first antenna port in an antenna set of the first site is combined with a second antenna port in an antenna set of the second site to form one antenna port, and data sent through the antenna port is a same modulation symbol sent by a first antenna and a second antenna on a same time-frequency resource.

In a case of the first meaning, in a solution in this embodiment, an antenna port in a first antenna port set used by the first site is different from an antenna port in a second antenna port set used by the second site. In other words, the first antenna port set belongs to a QCL set, and the second antenna port set belongs to another QCL set, and the two QCL sets are non-QCL. In addition, in this embodiment, data may be sent to the terminal on a same time domain symbol by using two non-QCL antenna ports.

In a case of the second meaning, although the first site and the second site send data on different time domain symbols, antenna ports are pre-assigned in this embodiment, and not all antenna ports in the first antenna port set used by the first site are the same as antenna ports in the second antenna port set used by the second site.

As shown in FIG. 3, a difference from the scenario shown in FIG. 2 is that both the first site and the second site access a centralized scheduler. The first site and the second site may not directly communicate with each other, and the control information and/or the indication information are/is delivered by the centralized scheduler to the first site and the second site.

During actual deployment, the centralized scheduler may be a separate physical device, or may be a function module integrated on the first site or a function module integrated on another device. This is not limited in this application.

It should be understood that only one terminal and two sites are shown in the communications system shown in FIG. 2 and FIG. 3, but this application is not limited thereto. In addition to the two sites, the communications system may further include an adjacent site that transmits a service on a same time-frequency resource and a terminal, and a coverage area of each network side device may further include another quantity of terminals. Further, optionally, in FIG. 2 and FIG. 3, the communications system in which the sites and the terminal are located may further include another network entity such as a network controller and/or a mobility management entity. This is not limited in this application.

Figure 4:
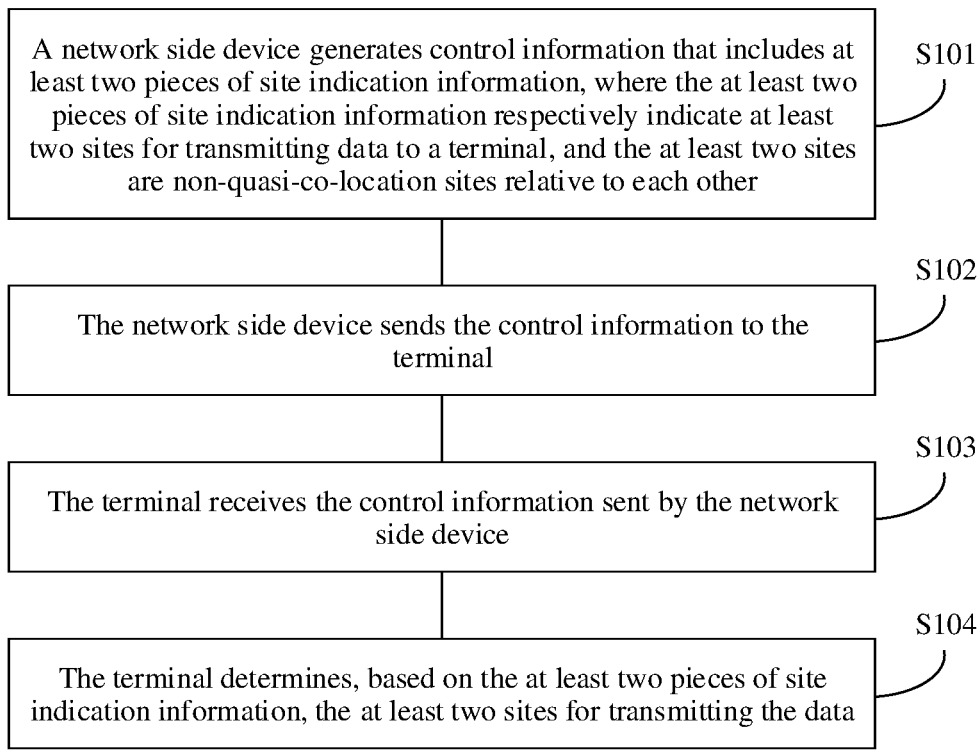
FIG. 4 is a schematic flowchart of Embodiment 1 of a multipoint data transmission method according to this application.

FIG. 4 is a schematic flowchart of Embodiment 1 of a multipoint data transmission method according to this application. As shown in FIG. 4, the method includes the following steps.

S101. A network side device generates control information that includes at least two site indication messages, where the at least two site indication messages respectively indicate at least two sites for transmitting data to a terminal, and the at least two sites are non-quasi-co-location sites.

The at least two sites are in a one-to-one correspondence with the at least two site indication messages, that is, a quantity of site indication messages configured by the network side device is equal to a quantity of non-quasi-co-location sites for transmitting the data to the terminal. The site indication message may be an index number configured for a group of quasi-co-location parameters, and the terminal may determine configuration parameters of these non-quasi-co-location sites based on the index number.

It should be noted that the network side device may be one of the at least two sites, and may be specifically a serving site in the at least two sites. However, this application is not limited thereto.

The site indication message may be a PQI. Two non-quasi-co-location sites are used as an example. It is assumed that one non-quasi-co-location site is a serving site, the other non-quasi-co-location site is a coordinated site, and the serving site and the coordinated site may be respectively indicated by a $PQI_0$ and a $PQI_1$ to generate control information. The control information includes the at least two site indication messages.

S102. The network side device sends the control information to the terminal.

For example, in a specific implementation process, the control information may be DCI, and may be specifically DCI in a format 2D or 2C. The DCI in the format 2D is used as an example. One site indication message may specifically include one or more bits. That the site indication message includes two bits is used as an example. Values of the two bits represent index numbers configured for different quasi-co-location parameters, that is, PQI field values, for example, shown in Table 1.

TABLE 1

| PQI Field Value | Description |
| --- | --- |
| '00' | Parameter group 1 configured by higher layer signaling |
| '01' | Parameter group 2 configured by higher layer signaling |
| '10' | Parameter group 3 configured by higher layer signaling |
| '11' | Parameter group 4 configured by higher layer signaling |

Specifically, in the control information, site indication messages corresponding to the sites may be arranged in a preset order. It is assumed that there are two sites, and the two sites are respectively indicated by a $PQI_0$ and a $PQI_1$. For example, if the $PQI_0$ is 00 and the $PQI_1$ is 01, two site indication messages in the control information are denoted as "0001".

Certainly, this application is not limited to the foregoing example, and each site indication message may occupy one or more bits, as long as the at least two site indication messages may be arranged in a specific order.

S103. The terminal receives the control information sent by the network side device.

S104. The terminal determines, based on the at least two site indication messages, the at least two sites for transmitting the data.

For example, either of site indication messages $PQI_0$ and $PQI_1$ corresponding to two sites occupies two bits, and in an order, the terminal may first read two bits of the $PQI_0$, for example, "00", and then read two bits of the $PQI_1$, for example, "01". However, this application is not limited thereto.

The terminal may obtain, based on the at least two site indication messages in the control information, related information of the at least two non-quasi-co-location sites for transmitting data to the terminal, and further, the terminal can receive the data transmitted by the at least two sites.

In this embodiment, the network side device generates the control information that includes the at least two site indication messages, and sends the control information to the terminal, so that after receiving the control information, the terminal can learn of, based on the at least two site indication messages in the control information, the at least two non-quasi-co-location sites for transmitting the data to the terminal. Therefore, in a distributed MIMO scenario, the terminal can obtain site indication messages corresponding to a plurality of non-quasi-co-location sites, and the plurality of non-quasi-co-location sites for transmitting data can be indicated to the terminal, so that the terminal can receive the data transmitted by these non-quasi-co-location sites.

It should be noted that when receiving the control information, the terminal may perform blind detection. Before the terminal receives the control information sent by the network side device, the terminal further needs to know a size of the control information, so as to facilitate the terminal in receiving the control information. To be specific, the terminal needs to perform blind detection based on the size of the control information. Specifically, the terminal may obtain the size of the control information based on a quantity of at least two sites.

Optionally, in a manner, the network side device preconfigures a quantity of sites for transmitting data to the terminal, and therefore, the terminal learns of a quantity of site indication messages in the control information and the size of the control information in advance. To be specific, the terminal obtains a quantity of bits of the control information based on the preset quantity of at least two sites.

Optionally, in another manner, the network side device dynamically indicates, by using higher layer signaling, a quantity of sites for transmitting data to the terminal. To be specific, the network side device indicates a quantity of site indication messages in the control information. Then, the terminal dynamically calculates the size of the control information. To be specific, the terminal receives configuration information sent by the network side device, the configuration information is used to indicate the quantity of at least two sites, and the terminal further obtains a quantity of bits of the control information based on the quantity of at least two sites. In this dynamic indication manner, the network side device determines, based on a receiving capability of the terminal, the quantity of sites for transmitting the data to the terminal. This manner is more flexible.

Correspondingly, the terminal receives, based on the quantity of bits of the control information, the control information sent by the sites.

Optionally, before the terminal receives the control information sent by the network side device, the terminal may further obtain a data transmission manner of the at least two sites. The data transmission manner may be a multipoint diversity coordinated transmission manner, a multipoint multiflow coordinated transmission manner, or the like. This is not limited herein.

After learning of the data transmission manner, the terminal may also learn of information such as the size of the control information, and the terminal may further perform blind detection on the control information.

Based on the foregoing embodiment, a quantity of transport layers and port numbers of ports that are used by the at least two sites further need to be indicated to the terminal. It should be noted that, in a multiple-antenna LTE system, to distinguish between different channels, different logical ports are defined, and are mainly classified into three types as follows.

(1) A cell-specific reference signal (CRS), where the cell-specific reference signal is a most basic downlink reference signal in LTE. In a cell, there may be one, two, or four cell-specific reference signals, and the one, two, or four cell-specific reference signals are defined as one, two, or four antenna ports. In an LTE specification, the antenna ports are particularly antenna ports with port numbers 0 to 3.

(2) A user-level reference signal, for example, a DMRS, where the user-level reference signal is specially used by the terminal to perform channel estimation on a PDSCH in transmission modes 7 to 10. In an LTE specification, the terminal may configure a maximum of eight different PDSCH DMRSs at antenna ports with port numbers 7 to 14.

(3) A CSI reference signal (CSI-RS), where the CSI reference signal is used by the terminal to obtain CSI in cases of transmission modes 9 and 10. In an LTE specification, antenna ports corresponding to the CSI-RS are particularly antenna ports with port numbers 15 to 22.

The port numbers mentioned in this application are generally port numbers 7 to 14. Certainly, this application is not limited thereto.

Optionally, the control information may further include transmission parameter indication information, and the transmission parameter indication information is used to indicate a quantity of transport layers and port numbers of ports that are used by the at least two sites.

Specifically, in the control information, one or more bits may be used as the transmission parameter indication information, and a value of the bit of the transmission parameter indication information indicates the quantity of transport layers and the port numbers of the ports that are used by the at least two sites. Each of groups of a quantity of transport layers and port numbers that are corresponding to the at least two sites may have an index number, and a binary value of a bit of the index number may be used as the transmission parameter indication information.

Two sites are used as an example. For example, "0" indicates that a quantity of transport layers used by a first site is 1, a port number of a port used by the first site is 7 (1 layer, port 7), a quantity of transport layers used by a second site is 1, and a port number of a port used by the second site is 8 (1 layer, port 8).

For example, the transmission parameter indication information may have 16 values shown in Table 2, and the 16 values respectively indicate 16 groups of a quantity of transport layers and port numbers of ports that are used by the at least two sites.

TABLE 2

| Transmission Parameter Indication Information | First Site (PQI$_0$) | Second Site (PQI$_1$) |
|---|---|---|
| 0 | 1 layer, port 7 | 1 layer, port 8 |
| 1 | 1 layer, port 7 | 2 layers, ports 8-9 |
| 2 | 1 layer, port 7 | 3 layers, ports 8-10 |
| 3 | 1 layer, port 7 | 4 layers, ports 8-11 |
| 4 | 2 layers, ports 7-8 | 1 layer, port 9 |
| 5 | 2 layers, ports 7-8 | 2 layers, ports 9-10 |
| 6 | 2 layers, ports 7-8 | 3 layers, ports 9-12 |
| 7 | 2 layers, ports 7-8 | 4 layers, ports 9-13 |
| 8 | 3 layers, ports 7-9 | 1 layer, port 10 |
| 9 | 3 layers, ports 7-9 | 2 layers, ports 10-11 |
| 10 | 3 layers, ports 7-9 | 3 layers, ports 10-12 |
| 11 | 3 layers, ports 7-9 | 4 layers, ports 10-13 |
| 12 | 4 layers, ports 7-10 | 1 layer, port 11 |
| 13 | 4 layers, ports 7-10 | 2 layers, ports 11-12 |
| 14 | 4 layers, ports 7-10 | 3 layers, ports 11-13 |
| 15 | 4 layers, ports 7-10 | 4 layers, ports 11-14 |

An assignment manner shown in Table 2 is sequentially performing assignment in an order of port numbers and indexes of the site indication messages PQIs (PQI$_0$ and PQI$_1$). This application is not limited thereto. Alternatively, available ports may be divided into a plurality of groups (grouping may be specifically performed based on the quantity of at least two sites; to be specific, a total of two sites are divided into two groups). Specifically, grouping may be performed in a code division manner. To be specific, port numbers in each group are distinguished by using orthogonal cover codes (OCCs). That the port numbers are divided into two groups is used as an example. It is assumed that a group of port numbers 7, 8, 11, and 13 are in a same frequency domain and another group of port numbers 9, 10, 12, and 14 are in a same frequency domain, the two groups of port numbers are respectively assigned to two sites, and specific assignment is further performed based on a quantity of transport layers corresponding to each site. For example, the first site uses three transport layers, and the port numbers 7, 8, and 11 may be sequentially selected from the port numbers 7, 8, 11, and 13; and the second site uses two transport layers, and the port numbers 9 and 10 may be selected from the port numbers 9, 10, 12, and 14.

In addition, the port numbers may alternatively be divided in a frequency division manner. The port numbers are divided into a plurality of groups based on different frequency domain resources, each group is corresponding to one site, and the port numbers are further sequentially assigned based on a quantity of transport layers of the site. For example, the port numbers 7, 8, 11, and 13 are assigned to the first site, and the port numbers 9, 10, 12, and 14 are assigned to the second site. For details, refer to an example in Table 3. Alternatively, a value of each piece of transmission parameter indication information may be corresponding to one of groups of a quantity of transport layers and port numbers of at least two sites. However, this application is not limited thereto.

TABLE 3

| Transmission Parameter Indication Information | First Site (PQI$_0$) | Second Site (PQI$_1$) |
|---|---|---|
| 0 | 1 layer, port 7 | 1 layer, port 9 |
| 1 | 1 layer, port 7 | 2 layers, ports 9 and 10 |
| 2 | 1 layer, port 7 | 3 layers, ports 9, 10, and 12 |
| 3 | 1 layer, port 7 | 4 layers, ports 9, 10, 12, and 14 |
| 4 | 2 layers, ports 7 and 8 | 1 layer, port 9 |
| 5 | 2 layers, ports 7 and 8 | 2 layers, ports 9 and 10 |
| 6 | 2 layers, ports 7 and 8 | 3 layers, ports 9, 10, and 12 |
| 7 | 2 layers, ports 7 and 8 | 4 layers, ports 9, 10, 12, and 14 |
| 8 | 3 layers, ports 7, 8, and 11 | 1 layer, port 9 |
| 9 | 3 layers, ports 7, 8, and 11 | 2 layers, ports 9 and 10 |
| 10 | 3 layers, ports 7, 8, and 11 | 3 layers, ports 9, 10, and 12 |
| 11 | 3 layers, ports 7, 8, and 11 | 4 layers, ports 9, 10, 12, and 14 |
| 12 | 4 layers, ports 7, 8, 11, and 13 | 1 layer, port 9 |
| 13 | 4 layers, ports 7, 8, 11, and 13 | 2 layers, ports 9 and 10 |
| 14 | 4 layers, ports 7, 8, 11, and 13 | 3 layers, ports 9, 10, and 12 |
| 15 | 4 layers, ports 7, 8, 11, and 13 | 4 layers, ports 9, 10, 12, and 14 |

Correspondingly, a terminal side preconfigures a mapping relationship between the transmission parameter indication information and both of the quantity of transport layers and the port numbers of the at least two sites. For example, the terminal side may preconfigure a mapping table similar to Table 3. Further, the terminal determines, based on the transmission parameter indication information and the preset mapping relationship between the transmission parameter indication information and both of the quantity of transport layers and the port numbers of the at least two sites, the quantity of transport layers and the port numbers of the ports that are used by the at least two sites. For example, if the transmission parameter indication information in the control information received by the terminal is 15, the terminal may learn of, based on the preset mapping relationship between the transmission parameter indication information and both of the quantity of transport layers and the port numbers of the at least two sites, that corresponding to "15", the first site uses four transport layers and ports with port numbers 7 to 10 and the second site uses four transport layers and ports with port numbers 11 to 14.

Optionally, in an implementation, according to an indication requirement, the control information may include only the transmission parameter indication information.

Optionally, in another implementation, the control information further includes at least two pieces of transmission parameter indication information. The at least two pieces of transmission parameter indication information are in a one-to-one correspondence with the at least two sites, and the at least two pieces of transmission parameter indication information are respectively used to indicate a quantity of transport layers used by the at least two sites.

To be specific, in this embodiment, there may be a plurality of pieces of transmission parameter indication information, and each piece of transmission parameter indication information indicates a quantity of transport layers of one site. When indicating a plurality of sites, the transmission parameter indication information may be arranged in a specific order, so that the terminal identifies, in the preset order, the transmission parameter indication information corresponding to each site and further identifies a quantity of transport layers corresponding to each site.

Details are shown in Table 4.

TABLE 4

| Transmission Parameter Indication Information | Quantity of Transport Layers |
|---|---|
| 00 | 1 layer |
| 01 | 2 layers |
| 10 | 3 layers |
| 11 | 4 layers |

Specifically, one or more bits of the site indication message may be used as the transmission parameter indication information, and a different value of the transmission parameter indication information indicates a different quantity of transport layers. Referring to Table 4, for example, "00" indicates one layer and "01" indicates two layers. Specifically, if it is assumed that "00" indicates that a quantity of transport layers of a serving site is 1 and "01" indicates that a quantity of transport layers of a coordinated site is 2, in the control information, transmission parameter indication information "0001" may indicate a quantity of transport layers that are respectively corresponding to the two sites.

In a specific implementation process, a corresponding quantity of transport layers and a corresponding port number may be indicated in this manner. For example, "00" indicates "One transport layer and a port number 7", "01" indicates "two transport layers and port numbers 8 and 9", and therefore, transmission parameter indication information "0001" may indicate that the two sites are respectively corresponding to "One transport layer and a port number 7" and "two transport layers and port numbers 8 and 9". Certainly, this application is not limited thereto.

In this implementation, a dedicated bit may be further added to the control information, so as to indicate port numbers of ports used by the at least two sites. Specifically, there may be a plurality of indication manners. For example, port number indication information is added, and different port number indication information is corresponding to different port numbers.

Optionally, to save a resource, the control information includes port number set indication information. The port number set indication information occupies one or more bits, and different values of the port number set indication information indicate different sets of port numbers.

Optionally, the set of port numbers may include a port number assigned in a preset order of the port numbers to the set of port numbers, a port number assigned in a frequency division manner to the set of port numbers, or a port numbers assigned in a code division manner to the set of port numbers. However, this application is not limited to these assignment manners. Assigning the port numbers in the preset order of the port numbers is sequentially assigning the port numbers in an order of the port numbers. When the port numbers are assigned in the frequency division manner, the port numbers are first divided into a plurality of groups based on different frequency domain resources, each group is corresponding to one site, and the port numbers are further sequentially assigned based on the quantity of transport layers of the sites. Assigning the port numbers in the code division manner is mainly assigning port numbers on a same frequency domain resource in the code division manner. To be specific, the port numbers on the same frequency domain resource are assigned to different sites. In other words, the code division manner (which may be specifically an OCC manner) is used to ensure that DMRS parameter signals corresponding to the ports used by the sites are orthogonal to each other.

For example, it is assumed that the port number set indication information is one bit, and "0" and "1" respectively indicate two sets of port numbers. For example, the port number set indication information "0" indicates "assigning the port numbers in the preset order of the port numbers". The port numbers 7 to 14 are used as an example. A quantity of transport layers of the first site is 2, and port numbers 7 and 8 are correspondingly assigned; and a quantity of transport layers of the second site is 3, and port numbers 9, 10, and 11 are correspondingly assigned.

For example, the port number set indication information "1" indicates "assigning the port numbers in the frequency division manner". To be specific, the port numbers are divided into a plurality of groups based on different frequency domain resources. If it is assumed that the quantity of at least two sites is 2, the port numbers are divided into two groups based on the different frequency domain resources. For example, one group includes port numbers 7, 8, 11, and 13, and the other group includes port numbers 9, 10, 12, and 14. Each group is assigned to one site, and corresponding ports are further sequentially assigned based on a quantity of transport layers of each site. For example, the first site is corresponding to the port numbers 7, 8, 11, and 13, the quantity of transport layers of the first site is 2, and port numbers 7 and 8 are correspondingly assigned; and the second site is corresponding to the port numbers 9, 10, 12, and 14, the quantity of transport layers of the second site is 3, and port numbers 9, 10, and 12 are correspondingly assigned.

Certainly, the port number set indication information "1" may alternatively indicate "assigning the port numbers in the code division manner". If it is assumed that the port numbers 7, 8, 11, and 13 are on a same frequency domain resource and the port numbers 9, 10, 12, and 14 are on a same frequency domain resource, the port numbers 7, 8, 11, and 13 are assigned to different sites, and the port numbers 9, 10, 12, and 14 are assigned to different sites. Two sites are used as an example. Port numbers 7, 9, 13, and 14 may be assigned to the first site, and port numbers 8, 10, 11, and 12 may be assigned to the second site. For example, the first site uses two transport layers, and port numbers 7 and 13 may be assigned to the first site; and the second site also uses two transport layers, and port numbers 8 and 11 may be assigned to the second site. However, this application is not limited thereto.

Correspondingly, the terminal determines, based on the at least two pieces of transmission parameter indication information and a preset mapping relationship between the parameter transmission indication information and the quantity of transport layers, the quantity of transport layers used by the at least two sites. To be specific, the mapping relationship between the parameter transmission indication information and the quantity of transport layers is preset in the terminal, and after receiving the control information, the terminal performs searching and matching in the preset mapping relationship between the parameter transmission indication information and the quantity of transport layers based on the at least two pieces of transmission parameter indication information in the control information, so that the terminal can determine the quantity of transport layers used by each site.

Likewise, the terminal may obtain, based on the port number indication information and a preset mapping relationship between port number set indication information and a set of port numbers, a set of available port numbers assigned to each of the at least two sites.

Further, the terminal may determine, based on the set of available port numbers assigned to each of the at least two sites and the quantity of transport layers used by the at least two sites, port numbers of ports used by the at least two sites. To be specific, after learning of the set of available port numbers of each site, the terminal may further correspondingly obtain a port number of the site based on the learned quantity of transport layers used by the site. For example, the terminal learns of a manner of assigning port numbers in sequence, a quantity of transport layers of the first site is 2, and therefore, the terminal may determine that port numbers of the first site are 7 and 8; and a quantity of transport layers of the second site is 3, and therefore, the terminal may determine that port numbers of the second site are 9, 10, and 11.

Optionally, in an implementation, according to an indication requirement, the control information may include only the at least two pieces of transmission parameter indication information. Alternatively, the control information includes only the at least two pieces of transmission parameter indication information and the port number set indication information. This is not limited herein.

Further, the control information may further include indication information of a mapping manner of a codeword and a site, and the indication information of a mapping manner of a codeword and a site is used to indicate a mapping manner of at least two codewords and the at least two sites.

In this application, a plurality of sites transmit data in a coordinated manner, a total quantity of transport layers is generally greater than 1, and therefore, the plurality of sites are generally corresponding to one or more codewords. A mapping relationship between the codewords and the at least two sites may be any one or combination of the following: each codeword is corresponding to one site, each codeword is corresponding to a plurality of sites, or a plurality of codewords are corresponding to one site. This is not limited herein.

In a specific implementation process, when the quantity of at least two sites is the same as a quantity of codewords, each codeword may be usually corresponding to one site. For example, if there are two codewords $CW_0$ and $CW_1$ and there are also two sites: a first site and a second site, the $CW_0$ is corresponding to the first site, and the $CW_1$ is corresponding to the second site. When the quantity of at least two sites is greater than the quantity of codewords, each codeword may be corresponding to a plurality of sites, and a specific corresponding manner is not limited herein. For example, a polling manner may be used. If it is assumed that there are two codewords $CW_0$ and $CW_1$ and three sites, the $CW_0$ is corresponding to a first site, the $CW_1$ is corresponding to a second site, and the $CW_0$ is further corresponding to a third site. In other words, the $CW_0$(Codeword 0) is corresponding to two sites, and the $CW_1$ is corresponding to one site. When the quantity of at least two sites is less than the quantity of codewords, a plurality of codewords may be corresponding to one site. This is not limited herein. For a specific corresponding manner, refer to Table 5. However, the corresponding manner is not limited to Table 5.

TABLE 5

| Indication Information of a Mapping Manner of a Codeword and a Site | First Site | Second Site | Third Site |
| --- | --- | --- | --- |
| 0 | Codeword 0 | Codeword 0 | Codeword 1 |
| 1 | Codeword 0 | Codeword 1 | Codeword 0 |
| 2 | Codeword 0 | Codeword 1 | Codeword 1 |
| 3 | Codeword 1 | Codeword 0 | Codeword 0 |
| 4 | Codeword 1 | Codeword 0 | Codeword 1 |
| 5 | Codeword 1 | Codeword 1 | Codeword 0 |

Correspondingly, the terminal may obtain a mapping relationship between the at least two codewords and the at least two sites based on the mapping manner of the at least two codewords and the at least two sites.

Further, the terminal may obtain, based on the mapping relationship between the at least two codewords and the at least two sites and the quantity of transport layers used by the at least two sites, a quantity of transport layers that are respectively corresponding to the at least two codewords.

Optionally, when a total quantity of transport layers of the at least two sites is 2 or 4 and the data transmission manner is a transmit diversity-related transmission manner, a single codeword manner may be used. To be specific, there is only one codeword, and the codeword is corresponding to the total quantity 2 or 4 of transport layers. In this case, a mapping relationship between the single codeword and a quantity of layers may be directly preset in the terminal, and does not need to be indicated by the network side device. To be specific, the terminal can obtain, based on the preset mapping relationship between the single codeword and the quantity of transport layers, a mapping relationship between the single codeword and each of a quantity of transport layers used by the at least two sites.

It should be noted that the transmit diversity-related transmission manner may include a multipoint diversity coordinated transmission manner, or may be another new transmission manner, provided that the transmission manner is similar to transmit diversity. This is not limited herein.

When the total quantity of transport layers of the at least two sites is 2 or 4 and the data transmission manner is a transmit diversity-related transmission manner, fewer bits may be used if there is only one piece of transmission parameter indication information and the transmission parameter indication information only needs to indicate the quantity 2 or 4 of transport layers. Table 6 is used as an example. However, this application is not limited thereto.

TABLE 6

| Transmission Parameter Indication Information | First Site | Second Site |
| --- | --- | --- |
| 0 | 1 layer, port 7 | 1 layer, port 8 |
| 1 | 2 layers, ports 7 and 8 | 2 layers, ports 9 and 10 |

If there are at least two pieces of transmission parameter indication information, the transmission parameter indication information only needs to indicate a quantity 1 or 2 of transport layers of a single site. Table 7 is used as an example. However, this application is not limited thereto.

TABLE 7

| Transmission Parameter Indication Information | Quantity of Transport Layers |
|---|---|
| '0' | 1 layer |
| '1' | 2 layers |

Optionally, based on the foregoing embodiment, the terminal can receive data transmitted by the at least two sites to the terminal. The at least two sites may transmit data to the terminal on a same time-frequency resource block. In this case, each site uses a port with a different port number. Specific assignment is not limited herein, provided that port numbers of the sites are different.

Optionally, the control information may further include a resource block assignment (Resource Block Assignment) field indication. The resource block assignment field indication is used to indicate the time-frequency resource block on which the at least two sites transmit the data. The terminal may obtain, based on the resource block assignment field indication in the control information, the time-frequency resource block on which the at least two sites transmit the data.

In this application, at least two non-quasi-co-location sites that transmit data are indicated to the terminal, and information such as a port, a quantity of transport layers, and a codeword may be further indicated, so that the terminal can further learn of the port number, the quantity of transport layers, the codeword, and the like that are corresponding to each site. Therefore, the plurality of sites better transmit the data to the terminal in a coordinated manner in the distributed MIMO scenario.

Optionally, the control information may include at least two pieces of codeword indication information, and each piece of codeword indication information is corresponding to one codeword. Each piece of codeword indication information includes codeword transmission indication information and/or resource block indication information.

In this embodiment, this is equivalent to extension of a field of the codeword, and related information is further indicated to the terminal by using the codeword indication information.

The codeword transmission indication information is used to indicate one or more of the following transmission-related information: a quantity of transport layers used to transmit a corresponding codeword, a port number of a port used to transmit the corresponding codeword, a scrambling identity, data resource element mapping information, quasi-co-location indication information, and transmission point indication information.

The scrambling identity is used to indicate scrambling information of the data. For example, the scrambling identity may be carried by higher layer signaling or the like. Optionally, the scrambling identity may be a cell identity or a virtual identity. This is not limited herein. The virtual identity may be a negotiated common identity of a plurality of cells. This is not limited herein.

The data resource element mapping information is used to indicate information about a resource element to which data is mapped. For example, the data resource element mapping information may include resource element mapping information of reference signals such as a CRS, a channel state information-reference signal (CSI-RS), and a demodulation reference signal (DMRS). The terminal may determine, by using a data resource mapping identity, a resource element to which the data may be mapped. For example, the data resource mapping identity includes a cell identity (ID) or a CRS offset of a coordinated base station. The terminal may learn of, based on the cell identity or the CRS offset of the coordinated base station, a resource element of a CRS sent by the network side device, so as to prevent the terminal from decoding a physical downlink shared channel (PDSCH) on the resource element (RE).

The quasi-co-location indication information is used to indicate a large-scale feature of an antenna port of a site that transmits a corresponding codeword. To be specific, the quasi-co-location indication information indicates a large-scale feature of an antenna port of a site that transmits the codeword corresponding to the codeword transmission indication information. The large-scale feature may include one or more of delay spread, Doppler spread, a Doppler shift, an average channel gain, and an average delay. Specifically, the quasi-co-location indication information may indicate a relationship with a large-scale feature of a CRS antenna port or a relationship with a large-scale feature of a CSI-RS antenna port. Alternatively, the quasi-co-location indication information may implement indication in another manner.

The transmission point indication information is used to indicate the site that transmits the corresponding codeword. To be specific, the transmission point indication information indicates the site that transmits the codeword corresponding to the codeword transmission indication information.

It should be noted that, the network side device indicates one or a combination of the codeword transmission indication information and the resource block indication information based on a requirement. The codeword transmission indication information also indicates one or any combination of the plurality of pieces of information.

For example, the codeword transmission indication information indicates only one of the following: the quantity of transport layers used to transmit the corresponding codeword, the port number of the port used to transmit the corresponding codeword, the scrambling identity, the data resource element mapping information, the quasi-co-location indication information, and the transmission point indication information. Alternatively, the codeword transmission indication information indicates the quantity of transport layers used to transmit the corresponding codeword and the port number of the port used to transmit the corresponding codeword. Alternatively, the codeword transmission indication information indicates the quantity of transport layers used to transmit the corresponding codeword and the scrambling identity. Alternatively, the codeword transmission indication information indicates the quantity of transport layers used to transmit the corresponding codeword, the data resource mapping identity, and the like. Certainly, information indicated by the codeword transmission indication information is not limited thereto, and may include any combination thereof.

It should be noted that, when the codeword transmission indication information indicates some of the information: the quantity of transport layers used to transmit the corresponding codeword, the port number of the port used to transmit the corresponding codeword, the scrambling identity, the data resource element mapping information, the quasi-co-location indication information, and the transmission point indication information, other information, other than the information indicated by the codeword transmission indication information, in the information may be indicated by other identity information, dedicated information, or the like. This is not limited herein.

Specifically, when the codeword transmission indication information indicates only the quantity of transport layers used to transmit the corresponding codeword, a mapping relationship between the quantity of transport layers and a port number may be preset on the terminal side. Therefore, after determining the quantity of transport layers based on the codeword transmission indication information, the terminal may learn of, based on the mapping relationship between the quantity of transport layers and the port number, the port number of the port used to transmit the corresponding codeword. Similarly, a mapping relationship between the quantity of transport layers and the scrambling identity, the data resource mapping identity, or the like may be preset. Details are not described herein.

Alternatively, when the codeword transmission indication information indicates only the port number of the port used to transmit the corresponding codeword, a mapping relationship between the port number and a quantity of transport layers may be preset on the terminal side. Therefore, after determining the port number, the terminal may obtain the quantity of layers used to transmit the corresponding codeword.

Alternatively, when the codeword transmission indication information indicates the quantity of transport layers used to transmit the corresponding codeword and the port number of the port used to transmit the corresponding codeword, a joint indication method and a separate indication method may be used.

Joint indication means that one identity (for example, one bit) in the codeword transmission indication information indicates both the quantity of transport layers used to transmit the corresponding codeword and the port number of the port used to transmit the corresponding codeword. In this case, the terminal side may learn of, based on a mapping relationship between the identity and both of a quantity of transport layers and a port number, the quantity of transport layers used to transmit the corresponding codeword and the port number of the port used to transmit the corresponding codeword.

Separate indication means that two identities (for example, two bits) in the codeword transmission indication information respectively indicate the quantity of transport layers used to transmit the corresponding codeword and the port number of the port used to transmit the corresponding codeword. In this case, the terminal may determine, based on an identity corresponding to the quantity of transport layers, the quantity of transport layers used to transmit the corresponding codeword, and determine, based on an identity corresponding to the port number, the port number of the port used to transmit the corresponding codeword. Other information may be obtained based on a preset mapping relationship between the quantity of transport layers and the other information, or may be indicated by an independent identity. This is not limited herein.

Alternatively, when the codeword transmission indication information indicates the transmission point indication information, the transmission point indication information may be independently indicated (for example, by occupying one bit). Other information that is also to be indicated, for example, the quantity of transport layers used to transmit the corresponding codeword, the port number of the port used to transmit the corresponding codeword, and the scrambling identity, may be jointly indicated (for example, by occupying one bit) or separately indicated (for example, by separately occupying bits). This is not limited herein.

Alternatively, when the codeword transmission indication information indicates the transmission point indication information, the terminal further learns of the quantity of transport layers and the port number based on a mapping relationship between a site and both of a quantity of transport layers and a port number. Alternatively, the terminal further learns of, based on a mapping relationship between a site and a quantity of transport layers, the quantity of transport layers used to transmit the corresponding codeword, and further determines, based on a preset rule, the port number of the port used to transmit the corresponding codeword. The preset rule may be an ascending rule. For example, when the transport layer is a first layer, the port number is 7, and when the transport layer is a second layer, the port number is 8. This is not limited herein. The preset rule may be another rule, for example, adding or deducting a preset number.

When the codeword transmission indication information indicates the data resource element mapping information and the quasi-co-location indication information, the joint indication method or the separate indication method may be used. This is not limited herein. When the data resource element mapping information and the quasi-co-location indication information are indicated through joint indication, a joint identity may be used for indication. For example, a PDSCH resource element mapping and quasi-co-location indicator (PDSCH RE Mapping and Quasi-Co-Location Indicator) in an existing protocol is used.

For example, it is assumed that the control information is DCI, one piece of codeword transmission indication information is configured for each codeword in one piece of DCI, and the codeword transmission indication information indicates one or more of the transmission-related information. It is assumed that the information is transmitted in a "DCI format 2D" and includes a transport block 1 and a transport block 2, and each transport block is mapped to one codeword. It is assumed that the transport block 1 is mapped to a codeword 0, and the transport block 2 is mapped to a codeword 1. Therefore, for the transport block 1, "the port number of the port used to transmit the corresponding codeword, the scrambling identity, and the quantity of transport layers used to transmit the corresponding codeword" occupy three bits, and "the data resource element mapping information and the quasi-co-location indication information" occupy two bits. For the transport block 2, "the port number of the port used to transmit the corresponding codeword, the scrambling identity, and the quantity of transport layers used to transmit the corresponding codeword" occupy three bits, and "the data resource element mapping information and the quasi-co-location indication information" occupy two bits. However, this application is not limited thereto. It should be noted that the codeword may be understood as a coded transport block.

Specifically, a mapping relationship between the codeword transmission indication information and the transmission-related information, and/or a mapping relationship between codeword resource block indication information and a time-frequency resource block may be preconfigured on the terminal side.

Further, when the codeword indication information includes the codeword transmission indication information, the terminal determines transmission-related information of the at least two codewords based on the codeword transmission indication information and the preset mapping relationship between the codeword transmission indication information and the transmission-related information. The transmission-related information is information indicated by the codeword transmission indication information. The information indicated by the codeword transmission indication information includes the quantity of transport layers used to transmit the corresponding codeword, the port number of the port used to transmit the corresponding codeword, the scrambling identity, the data resource element mapping information, the quasi-co-location indication information, and the transmission point indication information.

Table 8 is used as an example. It is assumed that the control information includes two pieces of codeword indication information, the two pieces of codeword indication information are respectively corresponding to two codewords, and the two codewords are denoted as a "codeword 0" and a "codeword 1".

TABLE 8

| Codeword 0-Codeword Indication Information 1 Value (Codeword | | Codeword 1-Codeword Indication Information 2 Value (Codeword | |
| --- | --- | --- | --- |
| Transmission Indication Information) | Transmission-Related Information | Transmission Indication Information) | Transmission-Related Information |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In the example of Table 8, the codeword transmission indication information has eight different values that may indicate eight different cases, and may specifically occupy three bits in the control information. For example, "000" indicates a case of Value=0, and "001" indicates a case of Value=1. However, this application is not limited thereto. The bits may be extended to more bits to indicate more cases, and fewer bits may be used when there are fewer cases. The "codeword indication information 1" is used as an example. In four cases in which the codeword transmission indication information is 0 to 3, the quantity of transport layers, the port number, and the scrambling identity ($n_{SCID}$) are indicated. In three cases in which the codeword transmission indication information is 4 to 6, the quantity of transport layers and the port number are indicated. It is assumed that the codeword transmission indication information received by the terminal is "000". Information such as one layer, a port 7, and $n_{SCID}=0$ may be obtained based on a correspondence shown in Table 8. To be specific, a quantity of transport layers used to transmit codeword 0 is 1, a port number of a port used to transmit codeword 1 is 7, and the scrambling identity is $n_{SCID}=0$.

It should be noted that at least two codewords corresponding to the at least two pieces of codeword indication information may be from one site or a plurality of different sites, and a same codeword may be from a plurality of different sites. For example, different sites separately transmit different layers of the same codeword.

Further, the resource block indication information is used to indicate a resource block for transmitting the corresponding codeword. To be specific, the resource block indication information indicates a resource block for transmitting the codeword corresponding to the codeword transmission indication information.

Optionally, because resource blocks may be sent in different frequency bands, resource blocks of different codewords may be indicated by different resource indication information. A plurality of codewords may share information such as a quantity of transport layers and a port number.

In addition, a plurality of codewords may be corresponding to a same resource block. Optionally, the resource block indication information may indicate a plurality of codewords at a time. In other words, the plurality of codewords share one piece of resource block indication information.

Further, that the network side device sends the control information to the terminal may include: The network side device determines a control channel format based on a format of the control information and/or a transmission mode, and further, the network side device sends the control information based on the control channel format.

Optionally, the network side device may determine the control channel format based on a mapping relationship between the control channel format and "the format of the control information and/or the transmission mode".

Control information in different formats may carry different quantities of information bits, and may specifically carry different information content. Alternatively, a quantity of bits used for a same information field may be different. A different transmission mode may be corresponding to a different transmission manner. For example, the transmission mode may be corresponding to single antenna transmission, transmit diversity transmission, multiuser MIMO transmission, closed-loop spatial multiplexing transmission, or the like.

It should be noted that, when determining the control channel format based on the format of the control information and/or the transmission mode, the network side device mainly determines an aggregation level of a control channel based on the format of the control information and/or the transmission mode. The aggregation level of the control channel may refer to a resource (for example, a resource element (RE)) used to transmit information, and a higher aggregation level indicates more occupied REs. With extension of the control information, information carried by the control information keeps increasing. When a quantity of information bits carried by the control information exceeds a specific threshold, a control channel at a high aggregation level is more appropriate. When relatively large control information is sent by using the control channel at the high aggregation level, times of performing blind detection by the terminal may be reduced.

Specifically, the format of the control information may be in a form of an existing format in combination with a newly added format in this application. The newly added format may be a format in which various control information is included. For example, the newly added format may be a format in which "the codeword indication information and/ or the codeword resource block indication information" are/is included, and is denoted as a "DCI format 2E". This is not limited herein. Specifically, when decoding the newly added format, the terminal may obtain corresponding indication information based on a bit corresponding to a codeword field, and further learn of content indicated by the indication information.

The transmission mode (TM) may be a current transmission mode indicated to the network side device by using higher layer signaling. The transmission mode may be an existing transmission mode or a newly added transmission mode in this application, and is denoted as, for example, a "TM 11". The newly added transmission mode may be a transmission mode different from the existing transmission mode. This is not specifically limited. For example, in a newly added transmission mode for multipoint multiflow transmission, the network side device may perform multipoint multiflow transmission to the terminal in the newly added transmission mode.

When sending the control information to the terminal, the network side device may specifically use a PDCCH as the control channel. However, the network side device needs to determine a PDCCH format based on the format of the control information and/or the current transmission mode.

Details are shown in Table 9.

TABLE 9

| PDCCH Format Identity | Quantity of CCEs | Quantity of Resource Element Groups | Quantity of PDCCH Bits | TM/Control Information Format |
|---|---|---|---|---|
| 0 | 1 | 9 | 72 | TM 1 to TM 10/another format other than a "DCI format 2E" |
| 1 | 2 | 18 | 144 | TM 1 to TM 10/another format other than a "DCI format 2E" |
| 2 | 4 | 36 | 288 | TM 1 to TM 11 |
| 3 | 8 | 72 | 576 | TM 1 to TM 11 |

In Table 9, it is assumed that there are five formats of control information, and the formats are denoted as a DCI format 2A to the DCI format 2E. When the format of the control information is any one of the DCI format 2A to the DCI format 2D, any one of the PDCCH formats 0 to 3 may be used. When the format of the control information is the DCI format 2E, neither the PDCCH format 0 nor the PDCCH format 1 can be used. As shown in Table 9, resources of one PDCCH include a control channel element (CCE), a quantity of resource unit groups, and a quantity of PDCCH bits (to be specific, a quantity of bits that can be carried by one PDCCH). It can be learned that, resources of one PDCCH in the PDCCH format 0 or 1 are fewer than resources of one PDCCH in the PDCCH format 2 or 3. A quantity of information bits carried by the control information in the DCI format 2E is larger. A maximum quantity of information bits that can be carried by the PDCCH in the PDCCH format 0 or 1 is less than the quantity of information bits carried by the control information in the DCI format 2E, or when the PDCCH carries the information bit carried by the control information in the DCI format 2E, a code rate is greater than a specific threshold.

It is assumed that there are 11 transmission modes that may be denoted as the TM 1 to the TM 11. When the transmission mode is one of the TM 1 to the TM 10, any one of the PDCCH formats 0 to 3 may be used. When the transmission mode is the TM 11, neither the PDCCH format 0 nor the PDCCH format 1 is used. As shown in Table 9, resources of one PDCCH include a control channel element (CCE), a quantity of resource unit groups, and a quantity of PDCCH bits (to be specific, a quantity of bits that can be carried by one PDCCH). It can be learned that, resources of one PDCCH in the PDCCH format 0 or 1 are fewer than resources of one PDCCH in the PDCCH format 2 or 3. A quantity of information bits of control information that needs to be sent to the terminal in the TM 11 is larger. A maximum quantity of information bits that can be carried by the PDCCH in the PDCCH format 0 or 1 is less than a quantity of information bits of control information required by the terminal, or after the PDCCH carries the information bit of the control information required by the terminal, a code rate is greater than a specific threshold.

During specific implementation, the control channel format may be determined based on either of the format of the control information and the transmission mode, or the control channel format may be determined based on the format of the control information in combination with the transmission mode.

For example, the transmission mode is the TM 10, but the format of the control information is the DCI format 2E, and therefore, only the PDCCH format 2 or 3 is used. This is not limited herein.

Further, that the terminal receives the control information sent by the network side device may include: The terminal determines the control channel format based on the format of the control information and/or the transmission mode, and further, the terminal receives, based on the control channel format, the control information sent by the network side device. Compared with a method in which the terminal performs blind detection on the control information, the terminal determines the control channel format in a same manner as the network side device, and therefore, the terminal can more efficiently receive the control information.

Specifically, that the terminal determines the control channel format based on the format of the control information and/or the transmission mode may include: The terminal determines the control channel format based on a mapping relationship between the control channel format and "the format of the control information and/or the transmission mode".

Alternatively, the terminal receives control channel format information notified by the network side device, and further receives corresponding control information based on the received control channel format information.

Figure 5:
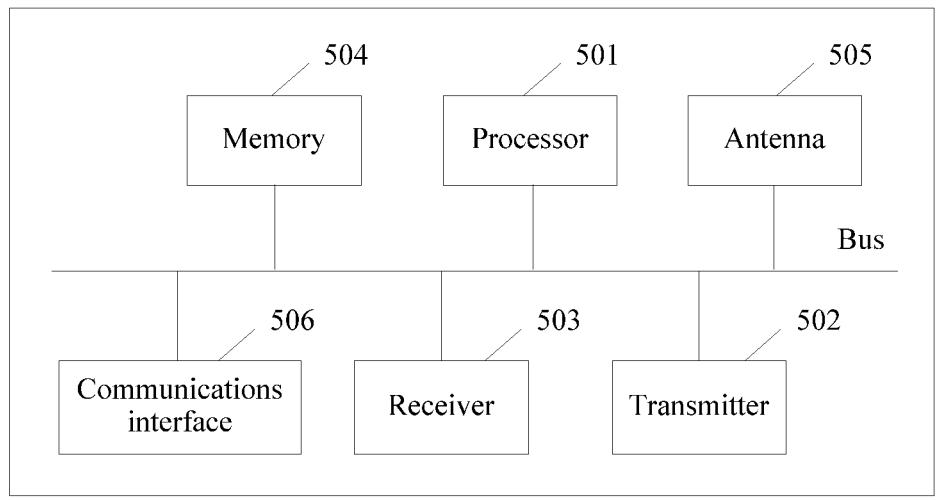
FIG. 5 is a schematic structural diagram of Embodiment 1 of a multipoint data transmission apparatus according to this application.

FIG. 5 is a schematic structural diagram of Embodiment 1 of a multiple-site data transmission apparatus according to this application. As shown in FIG. 5, the apparatus may be the foregoing network side device, and the apparatus may include a processor 501, a transmitter 502, a receiver 503, a memory 504, and an antenna 505.

The memory 504, the transmitter 502, the receiver 503, and the processor 501 may be connected by using a bus. Certainly, in actual application, there may not be a bus structure between the memory 504, the transmitter 502, the receiver 503, and the processor 501, but there may be another structure such as a star-shaped structure. This is not specifically limited in this application.

Optionally, the processor 501 may be specifically a general purpose central processing unit or an application-specific integrated circuit (ASIC), may be one or more integrated circuits configured to control program execution, may be a hardware circuit developed by using a field programmable gate array (FPGA), or may be a baseband processor.

Optionally, the processor 501 may include at least one processing core.

Optionally, the memory 504 may include one or more of a read-only memory (ROM), a random access memory (RAM), and a magnetic disk memory. The memory 504 is configured to store data and/or an instruction that are/is required when the processor 501 runs. There may be one or more memories 504.

Optionally, the apparatus may further include a communications interface 506. The communications interface 506 is also connected to another component by using the bus, and is configured to support communication between the network device and another network device in a communications system, for example, a core network node.

The apparatus may be configured to execute any method in the foregoing method embodiments. Details are as follows.

The processor 501 is configured to generate control information that includes at least two site indication messages, where the at least two site indication messages respectively indicate at least two sites for transmitting data to a terminal, the at least two sites are non-quasi-co-location sites, and the at least two sites are in a one-to-one correspondence with the at least two site indication messages.

The transmitter 502 is configured to send the control information to the terminal.

Further, before sending the control information to the terminal, the transmitter 502 is further configured to send configuration information to the terminal, where the configuration information is used to indicate a quantity of at least two sites.

In an implementation, the control information further includes transmission parameter indication information, and the transmission parameter indication information is used to indicate a quantity of transport layers and port numbers of ports that are used by the at least two sites.

In another implementation, the control information further includes at least two pieces of transmission parameter indication information. The at least two pieces of transmission parameter indication information are in a one-to-one correspondence with the at least two sites, and the transmission parameter indication information is used to indicate a quantity of transport layers used by a corresponding site.

Optionally, the control information further includes port number set indication information, and the port number set indication information is used to indicate a set of available port numbers assigned to the at least two sites.

The set of port numbers includes a port number assigned in a preset order of the port numbers to the set of port numbers, a port number assigned in a frequency division manner to the set of port numbers, or a port numbers assigned in a code division manner to the set of port numbers. This application is not limited thereto.

Optionally, the at least two sites transmit data to the terminal on a same time-frequency resource block.

Optionally, the at least two sites use ports with different port numbers.

Optionally, the control information further includes an indication of a mapping manner of at least two codewords and the at least two sites.

The mapping manner of the at least two codewords and the at least two sites includes any one or combination of the following: each codeword is corresponding to one site, each codeword is corresponding to a plurality of sites, or a plurality of codewords are corresponding to one site.

Optionally, the control information includes at least two pieces of codeword indication information, each piece of codeword indication information is corresponding to one codeword, and the codeword indication information includes codeword transmission indication information and/or codeword resource block indication information.

The codeword transmission indication information is used to indicate one or more of the following transmission-related information: a quantity of transport layers used to transmit a corresponding codeword, a port number of a port used to transmit the corresponding codeword, a scrambling identity, data resource element mapping information, quasi-co-location indication information, and transmission point indication information.

The codeword resource block indication information is used to indicate a time-frequency resource block for transmitting the corresponding codeword.

In addition, the processor 501 may determine a control channel format based on a format of the control information and/or a transmission mode, and further, the transmitter 502 sends the control information to the terminal based on the control channel format.

Figure 6:
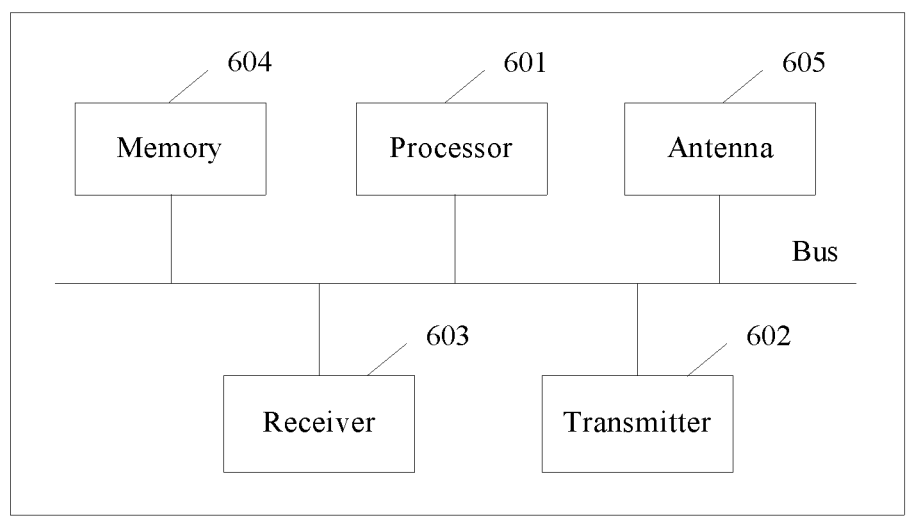
FIG. 6 is a schematic structural diagram of Embodiment 2 of a multipoint data transmission apparatus according to this application.

FIG. 6 is a schematic structural diagram of Embodiment 2 of a multiple-site data transmission apparatus according to this application. As shown in FIG. 6, the apparatus may be the foregoing terminal, and the apparatus may include a processor 601, a transmitter 602, a receiver 603, a memory 604, and an antenna 605.

The memory 604, the transmitter 602, the receiver 603, and the processor 601 may be connected by using a bus. Certainly, in actual application, there may not be a bus structure between the memory 604, the transmitter 602, the receiver 603, and the processor 601, but there may be another structure such as a star-shaped structure. This is not specifically limited in this application. For information such as functions of these components, refer to the embodiment in FIG. 5. Details are not described herein again.

The receiver 603 is configured to receive control information sent by a network side device, where the control information includes at least two site indication messages.

The processor 601 is configured to determine, based on the at least two site indication messages, at least two sites for transmitting data, where the at least two sites are non-quasi-co-location sites, and the at least two sites are in a one-to-one correspondence with the at least two site indication messages.

Before the receiver 603 receives the control information sent by the network side device, the processor 601 is further configured to obtain a quantity of bits of the control information based on a preset quantity of at least two sites.

Before receiving the control information sent by the network side device, the receiver 603 is further configured to receive configuration information sent by the network side device, where the configuration information is used to indicate the quantity of at least two sites. Correspondingly, the processor 601 is configured to obtain the quantity of bits of the control information based on the quantity of at least two sites.

Optionally, when receiving the control information sent by the network side device, specifically, the receiver 603 receives, based on the quantity of bits of the control information, the control information sent by the network side device.

In an implementation, the control information further includes transmission parameter indication information, and the transmission parameter indication information is used to indicate a quantity of transport layers and port numbers of ports that are used by the at least two sites.

Correspondingly, the processor 601 is further configured to determine, based on the transmission parameter indication information and a preset mapping relationship between the transmission parameter indication information and both of the quantity of transport layers and the port numbers of the at least two sites, the quantity of transport layers and the port numbers of the ports that are used by the at least two sites.

In another implementation, the control information further includes at least two pieces of transmission parameter indication information, and the at least two pieces of transmission parameter indication information are in a one-to-one correspondence with the at least two sites.

Correspondingly, the processor 601 is further configured to determine, based on the at least two pieces of transmission parameter indication information and a preset mapping relationship between the transmission parameter indication information and a quantity of transport layers, a quantity of transport layers used by the at least two sites.

Optionally, the control information further includes port number set indication information.

Correspondingly, the processor 601 is further configured to: obtain, based on the port number set indication information and a preset mapping relationship between the port number set indication information and a set of port numbers, a set of available port numbers assigned to each of the at least two sites; and determine, based on the set of available port numbers assigned to each of the at least two sites and the quantity of transport layers used by the at least two sites, port numbers of ports used by the at least two sites.

The set of port numbers includes a port number assigned in a preset order of the port numbers to the set of port numbers, a port number assigned in a frequency division manner to the set of port numbers, or a port numbers assigned in a code division manner to the set of port numbers.

Further, the receiver 603 is further configured to receive data transmitted by the at least two sites to the terminal on a same time-frequency resource block.

Optionally, the processor 601 is further configured to obtain a data transmission manner of the at least two sites and the terminal. Correspondingly, when receiving the control information sent by the network side device, specifically, the receiver 603 receives the control information based on the data transmission manner.

Further, when a total quantity of transport layers of the at least two sites is 2 or 4 and the data transmission manner is a transmit diversity-related transmission manner, the processor 601 is further configured to obtain, based on a preset mapping relationship between a single codeword and a quantity of transport layers, a mapping relationship between the single codeword and each of a quantity of transport layers used by the at least two sites.

Further, the control information further includes a mapping manner of at least two codewords and the at least two sites.

Correspondingly, the processor 601 is further configured to obtain a mapping relationship between the at least two codewords and the at least two sites based on the mapping manner of the at least two codewords and the at least two sites.

The processor 601 is further configured to obtain, based on the mapping relationship between the at least two codewords and the at least two sites and the quantity of transport layers used by the at least two sites, a quantity of transport layers that are respectively corresponding to the at least two codewords.

Optionally, the control information includes at least two pieces of codeword indication information, each piece of codeword indication information is corresponding to one codeword, and the codeword indication information includes codeword transmission indication information and/or codeword resource block indication information.

The codeword transmission indication information is used to indicate one or more of the following transmission-related information: a quantity of transport layers used to transmit a corresponding codeword, a port number of a port used to transmit the corresponding codeword, a scrambling identity, data resource element mapping information, quasi-co-location indication information, and transmission point indication information.

The codeword resource block indication information is used to indicate a time-frequency resource block for transmitting the corresponding codeword.

In one manner, the codeword indication information includes the codeword transmission indication information; and the processor 601 is further configured to determine transmission-related information of at least two codewords based on codeword transmission indication information of each codeword and a preset mapping relationship between the codeword transmission indication information and the transmission-related information.

In another manner, the codeword indication information includes the codeword resource block indication information; and the processor 601 is further configured to determine, based on the codeword resource block indication information and a preset mapping relationship between the codeword resource block indication information and a time-frequency resource block, the time-frequency resource block for transmitting the corresponding codeword.

Optionally, the processor 601 is further configured to determine a control channel format based on a format of the control information and/or a transmission mode. The receiver 603 is specifically configured to receive, based on the control channel format, the control information sent by the network side device.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A method, comprising:
generating control information that comprises transmission parameter indication information, wherein the transmission parameter indication information indicates a quantity of transport layers for at least two codewords and port numbers of ports used by the at least two codewords, wherein ports used by different codewords of the at least two codewords are non-quasi-co-located, and, when one codeword of the at least two codewords uses a plurality of ports, ports of the plurality of ports used by the one codeword of the at least two codewords are quasi-co-located; and
sending the control information to a terminal.

2. The method according to claim 1, wherein port numbers of ports used by different codewords of the at least two codewords correspond to different frequency resources.

3. The method according to claim 1, further comprising:
transmitting the at least two codewords to the terminal on a same time-frequency resource block.

4. The method according to claim 1, wherein the at least two codewords include two first codewords, and the quantity of transport layers for the two first codewords and port numbers of ports used by the two first codewords comprise:
the quantity of transport layers is 3, and the port numbers are 7, 9, 10;
the quantity of transport layers is 4, and the port numbers are 7, 8, 9, 10;
the quantity of transport layers is 5, and the port numbers are 7, 8, 9, 10, 12;
the quantity of transport layers is 6, and the port numbers are 7, 8, 11, 9, 10, 12;
the quantity of transport layers is 7, and the port numbers are 7, 8, 11, 9, 10, 12, 14; or
the quantity of transport layers is 8, and the port numbers are 7, 8, 11, 13, 9, 10, 12, 14.

5. The method according to claim 1, wherein the at least two codewords comprise a first codeword and a second codeword, and the method further comprises:
determining the quantity of transport layers for the first codeword and the second codeword, and port numbers of ports used by the first codeword and the second codeword, wherein the quantity of transport layers for the first codeword and the second codeword, and port numbers of ports used by the first codeword and the second codeword, comprise:
a quantity of transport layers for the first codeword is 1, and a port number used by the first codeword is 7, a quantity of transport layers for the second codeword is 2, and port numbers used by the second codeword are 9, 10;
a quantity of transport layers for the first codeword is 2, and port numbers used by the first codeword are 7, 8, a quantity of transport layers for the second codeword is 2, and port numbers used by the second codeword are 9, 10;
a quantity of transport layers for the first codeword is 2, and port numbers used by the first codeword are 7, 8, a quantity of transport layers for the second codeword is 3, and port numbers used by the second codeword are 9, 10, 12;
a quantity of transport layers for the first codeword is 3, and port numbers used by the first codeword are 7, 8, 11, a quantity of transport layers for the second codeword is 3, and port numbers used by the second codeword are 9, 10, 12;
a quantity of transport layers for the first codeword is 3, and port numbers used by the first codeword are 7, 8, 11, a quantity of transport layers for the second codeword is 4, and port numbers used by the second codeword are 9, 10, 12, 14; or
a quantity of transport layers for the first codeword is 4, and port numbers used by the first codeword are 7, 8, 11, 13, a quantity of transport layers for the second codeword is 4, and port numbers used by the second codeword are 9, 10, 12, 14.

6. A method, comprising:
receiving control information from a network side device, wherein the control information comprises transmission parameter indication information, wherein the transmission parameter indication information indicates a quantity of transport layers for at least two codewords and port numbers of ports used by the at least two codewords; and
determining, based on the transmission parameter indication information, the quantity of transport layers for the at least two codewords and the port numbers of the ports used by the at least two codewords, wherein ports used by different codewords of the at least two codewords are non-quasi-co-located, and when one codeword of the at least two codewords uses a plurality of ports, ports of the plurality of ports used by the one codeword of the at least two codewords are quasi-co-located.

7. The method according to claim 6, wherein port numbers used by different codewords of the at least two codewords correspond to different frequency resources.

8. The method according to claim 6, further comprising:
receiving the at least two codewords on a same time-frequency resource block.

9. The method according to claim 6, wherein the at least two codewords include two first codewords, and the quantity of transport layers for the two first codewords and the port numbers of ports used by the two first codewords comprise:
the quantity of transport layers is 3, and the port numbers are 7, 9, 10;
the quantity of transport layers is 4, and the port numbers are 7, 8, 9, 10;
the quantity of transport layers is 5, and the port numbers are 7, 8, 9, 10, 12;
the quantity of transport layers is 6, and the port numbers are 7, 8, 11, 9, 10, 12;
the quantity of transport layers is 7, and the port numbers are 7, 8, 11, 9, 10, 12, 14; or
the quantity of transport layers is 8, and the port numbers are 7, 8, 11, 13, 9, 10, 12, 14.

10. The method according to claim 6, wherein the at least two codewords include a first codeword and a second codeword, and the method further comprises:
- determining the quantity of transport layers for the first codeword and the second codeword, and port numbers of ports used by the first codeword and the second codeword, wherein the quantity of transport layers for the first codeword and the second codeword, and port numbers of ports used by the first codeword and the second codeword comprise:
- a quantity of transport layers for the first codeword is 1, and a port number used by the first codeword is 7, a quantity of transport layers for the second codeword is 2, and port numbers used by the second codeword are 9, 10;
- a quantity of transport layers for the first codeword is 2, and port numbers used by the first codeword are 7, 8, a quantity of transport layers for the second codeword is 2, and port numbers used by the second codeword are 9, 10;
- a quantity of transport layers for the first codeword is 2, and port numbers used by the first codeword are 7, 8, a quantity of transport layers for the second codeword is 3, and port numbers used by the second codeword are 9, 10, 12;
- a quantity of transport layers for the first codeword is 3, and port numbers used by the first codeword are 7, 8, 11, a quantity of transport layers for the second codeword is 3, and port numbers used by the second codeword are 9, 10, 12;
- a quantity of transport layers for the first codeword is 3, and port numbers used by the first codeword are 7, 8, 11, a quantity of transport layers for the second codeword is 4, and port numbers used by the second codeword are 9, 10, 12, 14; or
- a quantity of transport layers for the first codeword is 4, and port numbers used by the first codeword are 7, 8, 11, 13, a quantity of transport layers for the second codeword is 4, and port numbers used by the second codeword are 9, 10, 12, 14.

11. An apparatus, comprising:
- a processor, configured to generate control information that comprises transmission parameter indication information, wherein the transmission parameter indication information indicates a quantity of transport layers for at least two codewords and port numbers of ports used by the at least two codewords, wherein ports used by different codewords of the at least two codewords are non-quasi-co-located, and when one codeword of the at least two codewords uses a plurality of ports, the plurality of ports used by the one codeword of the at least two codewords are quasi-co-located; and
- a transmitter, configured to send the control information to a terminal.

12. The apparatus according to claim 11, wherein port numbers used by different codewords of the at least two codewords correspond to different frequency resources.

13. The apparatus according to claim 11, wherein the at least two codewords are transmitted to the terminal on a same time-frequency resource block.

14. The apparatus according to claim 11, wherein the at least two codewords include two first codewords, and the quantity of transport layers for the two first codewords, and the port numbers of ports used by the two codewords, comprise:
- the quantity of transport layers is 3, and the port numbers are 7, 9, 10;
- the quantity of transport layers is 4, and the port numbers are 7, 8, 9, 10;
- the quantity of transport layers is 5, and the port numbers are 7, 8, 9, 10, 12;
- the quantity of transport layers is 6, and the port numbers are 7, 8, 11, 9, 10, 12;
- the quantity of transport layers is 7, and the port numbers are 7, 8, 11, 9, 10, 12, 14; or
- the quantity of transport layers is 8, and the port numbers are 7, 8, 11, 13, 9, 10, 12, 14.

15. The apparatus according to claim 11, wherein the at least two codewords include a first codeword and a second codeword, and the processor is further configured to:
- determine the quantity of transport layers for the first codeword and the second codeword and port numbers of ports used by the first codeword and the second codeword, wherein the quantity of transport layers for the first codeword and the second codeword, and port numbers of ports used by the first codeword and the second codeword, comprise:
- a quantity of transport layers for the first codeword is 1, and a port number used by the first codeword is 7, a quantity of transport layers for the second codeword is 2, and port numbers used by the second codeword are 9, 10;
- a quantity of transport layers for the first codeword is 2, and port numbers for the first codeword are 7, 8, a quantity of transport layers for the second codeword is 2, and port numbers used by the second codeword are 9, 10;
- a quantity of transport layers for the first codeword is 2, and port numbers used by the first codeword are 7, 8, a quantity of transport layers for the second codeword is 3, and port numbers used by the second codeword are 9, 10, 12;
- a quantity of transport layers for the first codeword is 3, and port numbers used by the first codeword are 7, 8, 11, a quantity of transport layers for the second codeword is 3, and port numbers used by the second codeword are 9, 10, 12;
- a quantity of transport layers for the first codeword is 3, and port numbers used by the first codeword are 7, 8, 11, a quantity of transport layers for the second codeword is 4, and port numbers used by the second codeword are 9, 10, 12, 14; or,
- a quantity of transport layers for the first codeword is 4, and port numbers used by the first codeword are 7, 8, 11, 13, a quantity of transport layers for the second codeword is 4, and port numbers used by the second codeword are 9, 10, 12, 14.

16. An apparatus, comprising:
- a receiver, configured to receive control information from a network side device, wherein the control information comprises transmission parameter indication information, wherein the transmission parameter indication information indicates a quantity of transport layers for at least two codewords and port numbers of ports for the at least two codewords; and
- a processor, configured to determine, based on the transmission parameter indication information, a quantity of transport layers for at least two codewords and port numbers of ports for the at least two codewords, wherein ports used by different codewords of the at least two codewords are non-quasi-co-located, and when one codeword of the at least two codewords uses a plurality of ports, ports of the plurality of ports used by the one codeword of the at least two codewords are quasi-co-located.

17. The apparatus according to claim 16, wherein port numbers used by different codewords of the at least two codewords correspond to different frequency resources.

18. The apparatus according to claim 16, wherein the receiver is further configured to:
  receive the at least two codewords on a same time-frequency resource block.

19. The apparatus according to claim 16, wherein the at least two codewords include two first codewords, the quantity of transport layers for the two first codewords and port numbers of ports for the two first codewords comprise:
  the quantity of transport layers is 3, and the port numbers are 7, 9, 10;
  the quantity of transport layers is 4, and the port numbers are 7, 8, 9, 10;
  the quantity of transport layers is 5, and the port numbers are 7, 8, 9, 10, 12;
  the quantity of transport layers is 6, and the port numbers are 7, 8, 11, 9, 10, 12;
  the quantity of transport layers is 7, and the port numbers are 7, 8, 11, 9, 10, 12, 14; or,
  the quantity of transport layers is 8, and the port numbers are 7, 8, 11, 13, 9, 10, 12, 14.

20. The apparatus according to claim 16, wherein the at least two codewords include a first codeword and a second codeword, and the processor is further configured to:
  determine the quantity of transport layers for the first codeword and the second codeword, and port numbers of ports for the first codeword and the second codeword, wherein the quantity of transport layers for the first codeword and the second codeword, and port numbers of ports for the first codeword and the second codeword, comprise:
  a quantity of transport layers for the first codeword is 1, and port numbers used by the first codeword are 7, a quantity of transport layers for the second codeword is 2, and port numbers used by the second codeword are 9, 10;
  a quantity of transport layers for the first codeword is 2, and port numbers used by the first codeword are 7, 8, a quantity of transport layers for the second codeword is 2, and port numbers used by the second codeword are 9, 10;
  a quantity of transport layers for the first codeword is 2, and port numbers used by the first codeword are 7, 8, a quantity of transport layers for the second codeword is 3, and port numbers used by the second codeword are 9, 10, 12;
  a quantity of transport layers for the first codeword is 3, and port numbers used by the first codeword are 7, 8, 11, a quantity of transport layers for the second codeword is 3, and port numbers used by the second codeword are 9, 10, 12;
  a quantity of transport layers for the first codeword is 3, and port numbers used by the first codeword are 7, 8, 11, a quantity of transport layers for the second codeword is 4, and port numbers used by the second codeword are 9, 10, 12, 14; or,
  a quantity of transport layers for the first codeword is 4, and port numbers used by the first codeword are 7, 8, 11, 13, a quantity of transport layers for the second codeword is 4, and port numbers used by the second codeword are 9, 10, 12, 14.

* * * * *